United States Patent
Ruby et al.

(10) Patent No.: US 11,106,339 B2
(45) Date of Patent: Aug. 31, 2021

(54) DESIGNING AND RESIZING GRAPHICAL USER INTERFACES

(71) Applicant: Adobe Inc., San Jose, CA (US)

(72) Inventors: William Thomas Ruby, San Francisco, CA (US); Danielle T. Morimoto, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 229 days.

(21) Appl. No.: 15/709,061

(22) Filed: Sep. 19, 2017

(65) Prior Publication Data

US 2019/0087073 A1    Mar. 21, 2019

(51) Int. Cl.
    *G06F 3/0484*    (2013.01)
    *G06F 3/0481*    (2013.01)
    *G06F 9/44*      (2018.01)
    *G06F 9/451*     (2018.01)

(52) U.S. Cl.
    CPC ........ *G06F 3/04845* (2013.01); *G06F 3/0481* (2013.01); *G06F 3/04842* (2013.01); *G06F 9/451* (2018.02); *G06F 2203/04803* (2013.01)

(58) Field of Classification Search
    CPC .... G06F 3/04845; G06F 9/451; G06F 3/0481; G06F 3/04842; G06F 2203/04803
    See application file for complete search history.

(56) References Cited

U.S. PATENT DOCUMENTS

| | | | | |
|---|---|---|---|---|
| 5,396,590 A * | 3/1995 | Kreegar | ............... | G06F 3/04845 345/163 |
| 8,400,477 B1 * | 3/2013 | Young | ................. | G06F 3/04845 345/665 |
| 2004/0008224 A1 * | 1/2004 | Molander | ............. | G06F 3/0481 715/764 |
| 2007/0230828 A1 * | 10/2007 | Ignatchenko | ........ | H04N 1/3876 382/298 |
| 2011/0043458 A1 * | 2/2011 | Kumor | .................. | G06F 3/0482 345/173 |
| 2014/0245148 A1 * | 8/2014 | Silva | .................. | H04N 21/4126 715/719 |

(Continued)

FOREIGN PATENT DOCUMENTS

EP    0576178 A2 * 12/1993 ............. G06T 11/60

OTHER PUBLICATIONS

Cao, Jerry, Priority Matrix: The value of a unique UX (Year: 2013).*

(Continued)

*Primary Examiner* — Cesar B Paula
*Assistant Examiner* — Carl E Barnes, Jr.
(74) *Attorney, Agent, or Firm* — Keller Jolley Preece

(57) ABSTRACT

The present disclosure is directed toward systems, and corresponding computer-readable media and methods for resizing a graphical user interface. For instance, the systems described herein detect a user selection of an object within a graphical user interface, segment the user selection into quadrants, and move the quadrants to resize the selected object based on the user input. The systems further place a pivot point within the selected object to partition the object into the quadrants. The systems detect movement of one or more selected edges and move the quadrants together with movement of the one or more selected edges to resize the selected object.

20 Claims, 13 Drawing Sheets

(56) References Cited

U.S. PATENT DOCUMENTS

| | | | |
|---|---|---|---|
| 2015/0363082 A1* | 12/2015 | Zhao | G06F 3/0481 |
| | | | 715/800 |
| 2016/0103793 A1* | 4/2016 | Fang | G06F 16/986 |
| | | | 715/234 |
| 2017/0102857 A1* | 4/2017 | Badiger | G06F 3/04847 |
| 2018/0046361 A1* | 2/2018 | Shah | G06F 3/04845 |
| 2018/0181261 A1* | 6/2018 | Saurabh | G06F 3/0481 |

OTHER PUBLICATIONS

Rankin, Mike, Tip of the week: setting exact spacing between objects (Year: 2015).*

Adobe Photoshop, Pivot and scale around anchor point (Year: 2017).*

* cited by examiner

DESIGNING AND RESIZING GRAPHICAL USER INTERFACES

BACKGROUND

When using a digital workspace for resizing objects within a graphical user interface to, for example, rescale a user interface from smartphone dimensions to tablet dimensions, it is often desirable to scale a graphical user interface while maintaining spacing between objects or elements and without losing the overall look and feel of the interface. Conventional interface resizing systems enable a user to manipulate objects (e.g., images, buttons, or other user selections) within a graphical user interface to relocate or resize each object, and conventional systems provide tools for a user to manipulate dimensions of a graphical user interface. However, while conventional systems do provide users the ability to scale user interfaces to, for example, reformat for devices that have different dimensions (or for other purposes), conventional systems nonetheless have several disadvantages.

For example, conventional systems are often complicated and require a high level of sophistication on the part of the user to be effective. For instance, some systems only enforce specific, user-defined constraints on a graphical user interface, which requires a user to know how to define each constraint, and further requires a user to understand how the system will treat each input to yield a particular result. Thus, these conventional systems are not widely usable because of their more complex nature.

Another disadvantage of conventional systems is that conventional resizing systems cause object distortion or other undesirable visual effects. For instance, when a user resizes a digital object using some conventional systems, the object can stretch or squish as the user moves a selected corner of the object in one direction or another, distorting elements within the object. By distorting the appearance of the object, conventional systems suffer from inadequacies in consistently maintaining the characteristics of the object throughout a user input to resize the object.

Thus, there are several disadvantages with regard to conventional user interface resizing systems.

SUMMARY

One or more embodiments described herein provide benefits and solve one or more of the foregoing or other problems in the art with systems, methods, and computer-readable media for resizing a graphical user interface. In particular, the systems, methods, and computer-readable media described herein enable a user to select an object (e.g., a portion of a graphical user interface, such as an image, a link, a text box, a graphic, or other digital content) within a graphical user interface (or to select all the objects of a graphical user interface). To illustrate, in accordance with some embodiments of a disclosed interface resizing system, the system enables the user to select an object and then resize the object by moving one or more edges (e.g., by selecting and moving a side or corner) of the object. The interface resizing system determines relationships (e.g., based on distance) between the edges of the selected object (or between a selection boundary around a selection of multiple objects) and the content within the object. The interface resizing system maintains the determined relationships while resizing the selected object in accordance with the movement of an edge or corner of the object by the user.

To illustrate, and by way of an example, a system as described herein detects a user selection of an object (or multiple objects) of a graphical user interface. Based on the detected selection, the system adds and positions a pivot point within the selected object to segment the object into quadrants. By placing the pivot point at a location within the selected object, the system splits the selected object into four quadrants, each quadrant being bounded by two edges of the selected object, a horizontal boundary associated with a vertical position of the pivot point, and a vertical boundary associated with a horizontal position of the pivot point. The system then detects a user input to resize the selected object (e.g., a selection and movement of a side or corner of the object). The system locks the movement of each quadrant to the edges of the object bounding the quadrant. For instance, as the user moves (e.g., by a click-and-drag type input) the selected edge(s), the system moves the adjacent quadrants in accordance with the user input, as will be explained in further detail below.

Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
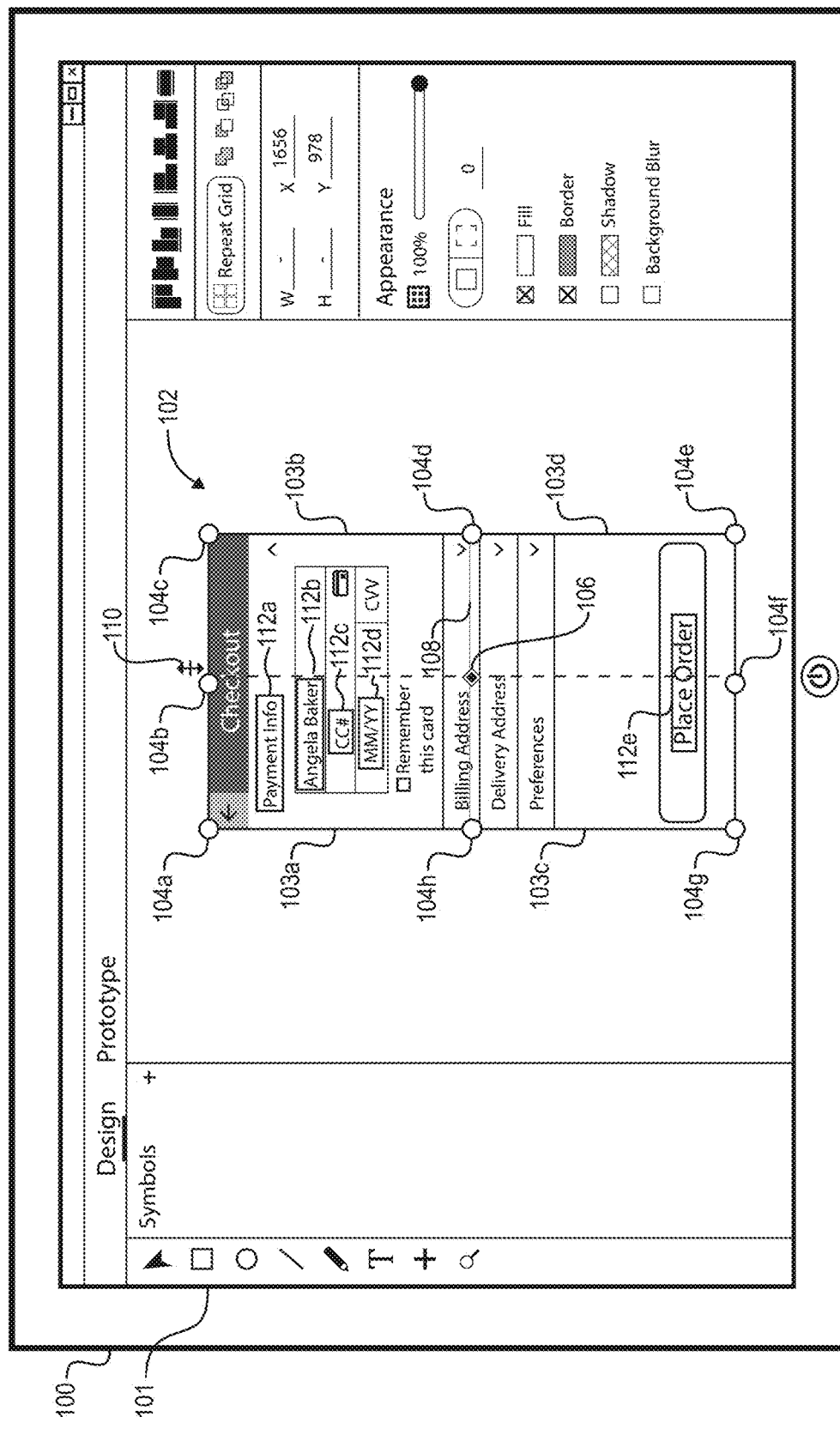
FIG. 1 illustrates an example graphical user interface including various attributes and elements in accordance with one or more embodiments.

One or more embodiments described herein provide benefits and solve one or more of the foregoing or other problems in the art with tools for designing and resizing graphical user interfaces. The details described herein introduce a graphical user interface resizing system ("interface resizing system" or simply "system") as well as corresponding computer-readable media and methods for resizing a graphical user interface or portions thereof. To resize a graphical user interface for compatibility with various devices, for example, the interface resizing system provides a simple mechanism for a user to select and resize portions of a graphical user interface or the whole graphical user interface using few operations.

To illustrate, the interface resizing system detects a user selection of one or more objects of a graphical user interface. The interface resizing system places (e.g., adds and positions) a pivot point within the selected object to segment the object into quadrants. In the case of detecting that the user selects more than one object, however, the interface resizing system places a pivot point with a selection boundary around the multiple selected objects. Indeed, by placing the pivot point at a location within the selected object (or other selection boundary), the interface resizing system splits the selected object into four quadrants, each quadrant being bounded by two edges (a vertical edge and a horizontal edge) of the selected object, a vertical position of the pivot point, and a horizontal position of the pivot point. The interface resizing system then detects a user input to resize the selected object. For example, the interface resizing system detects a user selection of one or more edges of the object, and, in response, fixes or locks any movement of the quadrant(s) bounded by the selected edge(s) to the movement of the selected edge(s). For instance, as the user moves (e.g., by a click-and-drag type input) the selected edge(s), the interface resizing system moves the adjacent quadrants in accordance with the user input. If the resizing enlarges the selected object in at least one direction, the system then inserts space between the moved quadrants. If the resizing reduces the size of the selected object in at least one direction, the system then removes the resulting overlap between the moved quadrants, as will be explained in more detail below.

As mentioned, the interface resizing system provides a pivot point to segment a selected object. The interface resizing system segments the selected object into quadrants based on the location of the pivot point. To illustrate, the interface resizing system segments, relative to the position of the pivot point within the object, the selected object into an upper-left quadrant, an upper-right quadrant, a lower-left quadrant, and a lower-right quadrant. In any case, when the interface resizing system receives user input to select an edge of the object (as described in further detail below), the interface resizing system binds each quadrant of the object to the edges of the object that are adjacent to each respective quadrant. For example, the interface resizing system binds the upper-left quadrant to the left edge of the object and also to the top edge of the object. Additional detail regarding the segmenting of the selected object based on the location of the pivot point is provided hereafter.

Generally, the interface resizing system places the pivot point at a default initial location centrally within the graphical user interface. However, the interface resizing system enables a user to manipulate the pivot point. For example, the interface resizing system provides a user-selectable pivot point and, in response to detecting a user input to select and move the pivot point, the interface resizing system relocates the pivot point in accordance with user input to move (e.g., drag) the pivot point. Additional detail regarding the pivot point is provided below.

As mentioned, the interface resizing system segments a user-selected object within a graphical user interface into different quadrants based on the location of the pivot point. By segmenting the object in this way, the interface resizing system effectively compartmentalizes the consideration for each quadrant, treating each quadrant independently from the others. For example, when the user selects a single edge of the object, the interface resizing system determines that the two quadrants that are adjacent to the selected edge will move with the direction of the user input to move the edge, whereas the two quadrants that are not adjacent to the selected edge will remain stationary. Likewise, when the user selects two edges of the object (e.g., by selecting a handle located on a corner of the object), the interface resizing system determines that the one quadrant adjacent to both selected edges will move in both a horizontal direction and a vertical direction in accordance with a horizontal component of user input and a vertical component of the user input, respectively. In addition, the interface resizing system determines that the two quadrants that are adjacent to one of the selected edges move with one of the directional (e.g., horizontal and vertical) components of the user input. The interface resizing system also determines that the quadrant that is adjacent only to non-selected edges will remain stationary. Additional detail regarding the segmented portions of objects within a graphical user interface is provided below with reference to the figures.

As mentioned above, the interface resizing system resizes an object within a graphical user interface by way of user input to move one or more edges of the object. For instance, the interface resizing system receives a user input to resize or rescale the object such as, for example, a click-and-drag input to move one or more edges of the object. As an example of user input to resize the graphical user interface, the interface resizing system may receive a user input to increase the size of an object within the graphical user interface in the form of a click-and-drag input in a direction away from a pivot point placed within the object, whereupon the interface resizing system increases the size of the object by adding new space to the object. As another example, the interface resizing system may receive a user input to decrease the size of the object in the form of a click-and-drag input in a direction toward the pivot point, whereupon the interface resizing system decreases the size of the object by removing space from the object.

More than moving the edge(s) of the image, the interface resizing system also moves portions of the graphical user interface adjacent to the moving edge(s). As described above, the interface resizing system segments a selected digital object into quadrants based on the placement of a pivot point. In one sense, the interface resizing system isomorphically segments the graphical user interface into rectangular portions, and binds those portions or quadrants of the graphical user interface to the edges of the selected object. Thus, in response to receiving user input to one or more of the edges of the object, the interface resizing system likewise moves those quadrants that are bound to the selected edge(s).

To illustrate, when a user selects an object within a graphical user interface, the interface resizing system places a pivot point within the selected object at an initial location—generally defaulted to the center of the object. In addition, the interface resizing system analyzes the selected object to identify any elements (e.g., text, titles, images, etc.) within each of the four quadrants delineated by the pivot point. The interface resizing system determines whether a given element exists solely within a single quadrant or else crosses a border between two or more quadrants. Furthermore, the interface resizing system constrains each identified element to a corner of each quadrant in which the element exists.

In other words, the interface resizing system determines a relationship between an identified element and each of the two sides of the selected object that make up two sides of the particular quadrant. For instance, if the interface resizing system identifies an element in the lower-right quadrant and that only exists in the lower-right quadrant, the interface resizing system determines a distance between the element and the right edge of the selected object and also determines a distance between the element and the bottom edge of the selected object. Thus, when the interface resizing system scales the selected object in response to user input, the interface resizing system can maintain the determined relationships between elements and edges, thereby preventing the elements from distorting in size or shape.

For an element that crosses a boundary between two or more quadrants, the interface resizing system pins the element to each quadrant in which it exists. Like the case described above where the element exists only in a single quadrant, the interface resizing system determines a relationship between the element and the corner formed by two of the edges of the selected object in each quadrant in which the element exists. For example, for an element that exists in both the lower-left quadrant and the lower-right quadrant, the interface resizing system determines, for the lower left quadrant, a distance between the element and left edge of the selected object and a distance between the element and the bottom edge of the selected object, and for the lower-right quadrant, the interface resizing system further determines a distance between the element and the right edge of the selected object and a distance between the element and the bottom edge of the selected object. In cases where an element exists in more than one quadrant, the interface resizing system pins the object to the edges of each quadrant and thereby scales the element in accordance with user input to maintain the relationships of the element with the edges of the object. Additional detail regarding the determination of relationships within a selected object is provided below with reference to the figures.

To resize the selected object of the graphical user interface, the interface resizing system moves the quadrants of the object that are bound to the selected edge(s), keeping the other quadrants in place. Accordingly, as the user drags an edge or corner (e.g., two edges) of the object outward away from the pivot point, the interface resizing system moves those quadrants bound to the moving edges of the object together with their respective edges. In this case, the interface resizing system increases the size of the object by adding space to fill the gap created by moving the edge(s) and separating the quadrants from their original positions. Similarly, as the user drags an edge or corner of the object inward toward the pivot point, the interface resizing system moves those quadrants bound to the moving edges of the object to collapse in on the other quadrant(s) of the object, resulting in the moving quadrants overlapping the non-moving quadrants. The interface resizing system decreases the size of the selected object by removing the overlapped space. Additional detail regarding the addition and removal of space from a selected object of a graphical user interface is provided below with reference to the figures.

In some cases, the interface resizing system generates sets of elements. More specifically, in these cases, the interface resizing system analyzes the selected object to determine relationships between elements and, for groups of elements that are related in a particular way, the interface resizing system identifies these groups of elements as sets. For example, if the interface resizing system identifies a rectangle that contains four icons laid out in a row (e.g., a banner with four column headings or banner with four equally-spaced buttons to share an image), the interface resizing system determines that, based on the relationship between the four icons within the rectangle (e.g., the uniformity of spacing), the four icons are a set. Furthermore, the interface resizing system generates sets recursively, where one set may be nested within another set. For instance, the interface resizing system may analyze the selected object to determine that the four icons within the rectangle are a set and may further determine that the rectangle containing those four icons is part of another set of three rectangles that have a particular relationship (e.g., similar size, shape, color, alignment, spacing, etc.) between them. In some cases, the interface resizing system analyzes the entire selection (e.g., the selected object) to determine whether any elements therein may be considered as part of a set based on any relationships between the elements.

With an identified set, the interface resizing system treats the elements of the set to maintain proportional positions. To illustrate, as the interface resizing system scales the selected object by moving the quadrant(s) in response to user input, the interface resizing system also distributes the elements of a set within the quadrant(s) in which the elements are located. In particular, the interface resizing system distributes elements of a set within a quadrant to maintain proportional positions within that quadrant, relative to other elements of the set and/or to the edges of the selected object. Referring again to the example of the four icons within a rectangle, if the rectangle spans the boundary between the upper-left and upper-right quadrants, the interface resizing system scales the rectangle with user input to resize the selected object and distributes the four icons within the rectangle to retain their relative positions within the rectangle. Additional detail regarding sets and determining relationships between elements is provided below with reference to the figures.

The interface resizing system described herein provides several advantages over conventional systems. For example, the interface resizing system described herein enables a user to resize a graphical user interface in fewer operations than conventional systems. Whereas conventional systems typically require element-by-element scaling and placement within a graphical user interface in a piece-meal approach, the interface resizing system described herein more intuitively analyzes a user selection to identify relationships between elements and scales the user selection to maintain those identified relationships.

As another advantage, the interface resizing system described herein provides simpler mechanics than conventional systems. Many conventional systems have complicated parameters that require a higher degree of sophistication on the part of the user to know the effects of each parameter in scaling a graphical user interface. The interface resizing system described herein, on the other hand, is simple and easy to use. By analyzing a user selection to determine relationships between elements within the user selection as well as between elements and the quadrants in which each element is located, and by maintaining those relationships throughout the scaling of the user selection, the interface resizing system greatly reduces the number of factors that a user must consider when resizing a graphical user interface. In addition, with intuitive select-and-drag mechanics to scale an object within a graphical user interface, up to and including the whole graphical user interface at once, the interface resizing system is simple to use, and therefore appeals to a wider user base.

Furthermore, the interface resizing system described herein prevents object distortion or other undesirable visual effects that might otherwise results from scaling a digital object. In particular, the interface resizing system provides constraints on elements within a user-selected object to maintain the characteristics (e.g., position, size, shape, etc.) of the elements as the interface resizing system resizes the object. As a user moves one or more sides of an object to increase or decrease its size, the interface resizing system maintains the characteristics of elements within the object to prevent the elements from distorting as the object changes size.

Because the interface resizing system requires fewer operations than conventional systems, the interface resizing system described herein further requires less data storage than conventional systems. Particularly, the interface resizing system stores fewer data points relating to various tools for resizing, repositioning, and other manipulation for each element within a graphical user interface. Rather, the interface resizing system stores information for a simple set of mechanics to enable a user to select and move edges of an object within a graphical user interface. Additionally, because the interface resizing system requires fewer operations to resize a graphical user interface, the interface resizing system therefore requires less data storage than otherwise tracking each individual operation throughout a resizing process.

The interface resizing system further requires less memory than conventional systems because the interface resizing system analyzes a user selection of a graphical user interface and determines relationships relating to those elements of the graphical user interface that are within the user selection. In particular, instead of storing information regarding relationships between each element within the entirety of the graphical user interface, the interface resizing system described herein takes a more local approach and determines relationships between elements within a user-selected area, and stores the corresponding information relating to the elements of the particular object or area within the graphical user interface.

Because the interface resizing system requires fewer operations than conventional systems, the interface resizing system also performs faster than conventional systems. In particular, the interface resizing system analyzes a user-selected area to determine relationships between elements within the user-selected area instead of analyzing the entire graphical user interface with each iterative step of resizing the graphical user interface. In addition, the interface resizing system segments the user-selected area into quadrants and treats each quadrant individually in terms of movement in response to user input and in terms relationships of elements to edges of each quadrant, which reduces the processing burden of otherwise scaling a graphical user interface while maintaining determined relationships between objects across the whole graphical user interface.

More detail regarding the interface resizing system will now be provided with reference to the figures. In particular, FIG. 1 illustrates a computing device 100 including a digital workspace 101 presented for display to a user. Additionally, the digital workspace 101 includes various user-selectable options, windows, tools, and other features of a digital medium environment for resizing a graphical user interface. As shown in FIG. 1, the digital workspace 101 includes a graphical user interface 102 for the user to select and manipulate in accordance with the features of the interface resizing system described herein. Discussed in further detail hereafter, the graphical user interface 102 includes an interface for checkout to complete a purchase via, for example, an online marketplace where the user enters payment information, billing address, etc.

As mentioned, FIG. 1 illustrates a graphical user interface 102. As used herein, a graphical user interface refers to a digital interface presentable to a user by way of a display and that is interactive with the user. For example, a graphical user interface may refer to a collection of images, banners, charts, graphs, buttons, icons, labels, and/or other elements presented within a display of a mobile device (e.g., a smartphone). Generally, a user may interact with a graphical user interface by, for example, selecting (e.g., with a finger, stylus, mouse, or other input device) a button or text input field to cause a mobile application associated with the graphical user interface to perform a specific function. As used herein, the graphical user interface 102 is presented for display within the digital workspace 101 in a work-in-progress sense, where a user is rearranging and manipulating buttons, images, and other elements within the graphical user interface 102. In other words, the graphical user interface 102 is editable and manipulable in response to user input received via resizing tools and/or other editing tools associated with the digital workspace 101.

The graphical user interface 102 of FIG. 1 includes the title "Checkout" in addition to other elements such as a payment information section where a user fills in a name, credit card number, and other information. In addition, as shown in FIG. 1, the graphical user interface 102 includes handles 104a-104h (referred to herein collectively as "handles 104") which enable a user to select and move various portions of the graphical user interface 102. To elaborate, the interface resizing system enables a user to select the graphical user interface 102 and, in response to detecting the user input to select the graphical user interface 102, generates a bounding box around the user-indicated selection (e.g., the graphical user interface 102) and further generates handles 104 along the bounding box on the edges of the graphical user interface 102.

In some cases, as will be discusses in further detail below with specific reference to FIGS. 7-8, the interface resizing system enables the user to select an individual object within the graphical user interface 102, without selecting the whole graphical user interface 102 at once. In other examples, the interface resizing system enables the user to select multiple objects and perform resizing operations on the multiple selected objects together. As used herein, an object refers to a user-selected portion of a graphical user interface such as, for example, a section, a column, a body of text, a user-defined area of a given size (e.g., a click-and-drag selection area), etc. In some embodiments, an object may refer to the entire graphical user interface (e.g., graphical user interface 102), while in other embodiments an object may refer to a portion that is less than the entire graphical user interface. However, for the discussion purposes of FIGS. 1-6, it will be beneficial to describe the interface resizing system and its functionalities with reference to a user selection that includes the entire graphical user interface 102.

As mentioned, FIG. 1 illustrates a user selection of the graphical user interface 102 whereupon the interface resizing system generates the handles 104 around the bounding box indicating the user selection. As used herein, a handle refers to an interactive, user-selectable icon that is generally depicted as a circle or other geometric shape. The interface resizing system generally places a handle on each corner of the user selection as well as on each edge of the user selection at the midpoint between each corner. Each handle enables the user to select either one or two edges of the user selection, and further enables the user to move the selected edges in a given input direction. For example, in response to detecting a user selection (e.g., via a touch input, mouse click, etc.) of a handle located on an edge of the user selection (e.g., on a single edge), the interface resizing system determines that the user has selected a single edge. On the other hand, in response to detecting a user selection of a handle located on a corner of the user selection, the interface resizing system determines that the user has selected the two edges of the user selection that intersect to form the given corner at which the handle is located.

In addition to generating handles on the user selection (e.g., the graphical user interface 102), the interface resizing system further places a pivot point 106 within the user selection. As used herein, a pivot point refers to a dot, circle, or other shape that the interface resizing system uses to separate different portions of the user selection. As shown in FIG. 1, the interface resizing system segments the graphical user interface 102 into four sections or quadrants based on the location of the pivot point 106. In particular, the interface resizing system segments the graphical user interface into an upper-right quadrant 103a, an upper-left quadrant 103b, a lower-left quadrant 103c, and a lower-right quadrant 103d (referred to herein collectively as "quadrants 103"). To segment the graphical user interface 102 into quadrants 103 based on the location of the pivot point 106, the interface resizing system uses the pivot point 106 as a reference for delineating the boundaries between the quadrants 103.

To illustrate, the interface resizing system places the pivot point 106 at a default central location within the graphical user interface 102 as shown in FIG. 1. The pivot point 106 has a vertical position as well as a horizontal position. For instance, the interface resizing system places the pivot point 106 at a particular coordinate location within the digital workspace 101 or within the graphical user interface 102, where the coordinate location includes a vertical component and a horizontal component. Accordingly, the interface resizing system segments the graphical user interface 102 into quadrants 103, where quadrant 103a is located above the vertical position/location and left of the horizontal position of the pivot point 106, where quadrant 103b is located above the vertical position and to the right of the horizontal position of the pivot point 106, where quadrant 103c is below the vertical position and to the left of the horizontal position of the pivot point 106, and where quadrant 103d is below the vertical position and to the right of the horizontal position of the pivot point 106.

While FIG. 1 depicts quadrants 103 as all being the same size, in some cases, quadrants 103 may be different sizes. In particular, in cases where the user moves the pivot point 106 to a different location, the interface resizing system segments the graphical user interface 102 based on the new location of the pivot point 106. For instance, if the user moves the pivot point directly downward from its location in FIG. 1, then quadrants 103a and 103b would be the same size and would be larger than quadrants 103c and 103d, which would also be the same size as each other. Additional detail regarding moving the pivot point 106 in response to user input is provided below with specific reference to FIG. 4.

Quadrants 103 are each bounded on two sides by edges of the user selection. In particular, since the interface resizing system generally operates with rectangular objects such as, for example, graphical user interface 102, each of quadrants 103 will also be rectangular in shape. Therefore, each quadrant of quadrants 103 is bounded on two sides by two edges of the graphical user interface 102. To illustrate, quadrant 103a is bounded on the left by the left edge of the graphical user interface 102 and on the top by the top edge of the graphical user interface 102. As another illustration, quadrant 103b is bounded on the right by the right edge of the graphical user interface 102 and on the top by the top edge of the graphical user interface 102. Likewise, quadrants 103c and 103d are also bounded on two sides by edges of the graphical user interface 102.

Upon segmenting the graphical user interface 102 or other user selection into quadrants 103, the interface resizing system analyzes the user selection to identify elements therein. As used herein, the term element refers to an individual piece of content within the graphical user interface 102 or some other user selection. In particular, an element can refer to a title, a text box, text within a text box, an image, an icon, a box, a line, a button, a label, etc. A given user selection such as an object (e.g., as defined above) or the graphical user interface 102 can include multiple elements. As illustrated in FIG. 1, for instance, the interface resizing system analyzes the graphical user interface 102 to identify elements 112a, 112b, 112c, 112d, and 112e (referred to herein collectively as "elements 112") within the graphical user interface 102. While FIG. 1 illustrates elements 112 including various text portions or headings, it will be understood from the disclosure herein that FIG. 1 includes more elements than those numbered in FIG. 1. For example, the interface resizing system identifies the credit card image as an element, the blank checkbox as an element, the text "Remember this card" as an element, the rectangle around element 112e as another element, the line above "Billing Address" as another element, etc. For ease of discussion and illustration, however, FIG. 1 includes only elements 112 to avoid clutter.

Additionally, in some embodiments, the interface resizing system analyzes each individual quadrant of the graphical user interface 102 to determine whether each element exists in one or more of the quadrants 103. To illustrate, the interface resizing system analyzes quadrant 103a to identify element 112a and to determine that element 112a exists only within quadrant 103a. Likewise, elements 112b, 112c, and 112d exist only within quadrant 103a. However, the interface resizing system analyzes quadrants 103c and 103d to identify element 112e, and determines that element 112 crosses the boundary between quadrants 103c and 103d. The interface resizing system determines, for each identified element throughout the user selection, whether the element exists only within a single quadrant or whether the element crosses a boundary of two or more quadrants.

For elements that exist within a single quadrant, the interface resizing system determines a relationship between the element and the edges of the selection. To illustrate from FIG. 1, the interface resizing system identifies element 112a and determines that element 112a exists only within quadrant 103a. Furthermore, the interface resizing system determines a relationship between element 112a and the top edge of the graphical user interface 102, and further determines a relationship between element 112a and the left edge of the graphical user interface. For instance, the interface resizing system determines a distance (e.g., a number of pixels, a number of millimeters, a fraction of an inch, or some other linear measurement) between element 112a and the top edge of the graphical user interface 102. In some embodiments, the interface resizing system determines the distance between the element 112a and the edge by determining the distance from the closest part of the element 112a (e.g., the topmost part) and the edge of the graphical user interface 102, while in other embodiments the interface resizing system determines a center or midpoint of the element 112a and calculates a distance from the midpoint to the edge of the graphical user interface 102. In still other embodiments, the interface resizing system determines a distance based on some other part of the element 112a.

In addition to determining a distance relationship between the element 112a and the top edge of the graphical user interface 102, the interface resizing system also determines a distance between the element 112*a* and the left edge of the graphical user interface 102. For instance, the interface resizing system calculates a distance from the left-most part of the element 112*a* and the left edge of the graphical user interface 102. In some embodiments, the interface resizing system calculates a distance from the midpoint of the element 112*a* to the left edge of the graphical user interface 102. In any case, the interface resizing system determines a horizontal placement of the element 112*a* in addition to determining a vertical placement as discussed above.

In some embodiments, the interface resizing system additionally or alternatively determines relationships between elements (e.g., elements 112) within a quadrant (e.g., quadrant 103*a*). For example, the interface resizing system determines relationships for the element 112*a* relative to other elements within the quadrant 103*a* as well. As shown in FIG. 1, the interface resizing system analyzes quadrant 103*a* to identify elements 112*a*, 112*b*, 112*c*, and 112*d* within quadrant 103*a*. Furthermore, the interface resizing system determines a spacing or distance between each of the elements identified within quadrant 103*a*. Accordingly, the interface resizing system determines a proportional spacing between each element within each quadrant.

In addition to determining relationships between elements, the interface resizing system also generates sets of elements. As used herein, a set refers to a number of elements within a graphical user interface (e.g., graphical user interface 102) that share features of one type or another or that belong together. To elaborate, a set refers to a grouping of elements that, based on their arrangement, color, location, spacing, etc., are related. Upon analyzing each quadrant of the graphical user interface 102, the interface resizing system generates sets of elements and groups those sets together such that, in response to user input to resize the graphical user interface 102, the interface resizing system scales, moves, or performs other operations to each of the elements within the set uniformly.

To illustrate by way of an example, the interface resizing system generates a set for elements based on a centroid (e.g., a geometric center) of each element. For instance, the interface resizing system identifies a number of elements that share an alignment (e.g., a vertical alignment or a horizontal alignment) in a context (e.g., within the same user-selected object) as a set. However, if the same user-selected object further contains an element that does not share the same alignment as the other elements, then the interface resizing system invalidates the entire set. Thus, the interface resizing system identifies sets of elements based on a high degree of confidence all the elements within the purported set share alignments (or other traits) that are meaningful.

As another example, and to illustrate from FIG. 1, the interface resizing system generates a set for elements 112*b*, 112*c*, and 112*d*. In particular, the interface resizing system determines that elements 112*b*-112*d* are each located within the same object (i.e., the group of data input fields for entering payment information) and have the same horizontal alignment of each of their respective centroids, as described above. Indeed, as shown in FIG. 1, the center of elements 112*b*-112*d* are horizontally aligned within the input field box. In some embodiments, the interface resizing system further determines that each of elements 112*b*-112*d* are the same font, that each of elements 112*b*-112*d* are uniformly distributed along a vertical direction, and/or that each of elements 112*b*-112*d* are left-aligned at the same horizontal position. Accordingly, because elements 112*b*-112*d* share characteristics that indicate to the interface resizing system that each of elements 112*b*-112*d* are related, the interface resizing system generates a set including each of elements 112*b*-112*d*, respectively.

In some embodiments, the interface resizing system considers one set of heuristics to determine whether a given group of elements belong to a set, while in other embodiments the interface resizing system considers a different set of heuristics to do the same. Particularly, in some embodiments, the interface resizing system considers only whether a subset of elements within a user selection (e.g., graphical user interface 102) is aligned within some other object within the selection. In other embodiments, the interface resizing additionally or alternatively considers font type, font size, color, arrangement, spacing, or other characteristics of the elements (e.g., elements 112) to determine whether the elements belong to a set. Additional detail regarding how the interface resizing system maintains relative positions and proportional spacing of elements within a set is provided below with reference to subsequent figures.

Though not shown in FIG. 1, the interface resizing system identifies elements and relationships for those elements within quadrants 103*b*, 103*c*, and 103*d* as well. As discussed above, the interface resizing system determines a distance between each element and the edges of the graphical user interface 102 that border the quadrant in which the element is located. By determining these relationships, the interface resizing system determines a placement of each element within its respective quadrant, in accordance with the considerations discussed above with relation to quadrant 103*a*.

For these elements such as element 112*a* that exist in a single quadrant, the interface resizing system determines these relationships to use as a tool to maintain the overall look and feel of the graphical user interface 102 throughout any resizing of the graphical user interface 102. For example, as will be discussed in further detail below, when a user moves an edge of the graphical user interface 102 (e.g., by selecting and dragging a handle located on the edge), the interface resizing system scales the graphical user interface 102 in accordance with the user input, while maintaining the determined distance relationships between elements 112 and the edges of the graphical user interface 102.

For elements that exist in more than one quadrant (e.g., element 112*e*), the interface resizing system applies similar rules during resizing. In particular, for the rectangular box around element 112*e* (not numbered), the interface resizing system determines that the rectangle crosses the boundary between quadrants 103*c* and 103*d*, and, during a user input to resize the graphical user interface 102, the interface resizing system maintains the distance of the element 112*e* and the edges of the quadrants 103*c* and 103*d*, and therefore scales the rectangle proportionally to keep the relationships of the element 112*e* consistent within the graphical user interface 102. In other words, rather than moving the rectangle with the moving quadrant (e.g., so it stays in the same position with regard to relevant edges of the quadrant) as would ordinarily be the case if the rectangle existed only in a single quadrant, the interface resizing system "pins" the rectangle within each quadrant that it is in, and scales the rectangle to fit properly within the graphical user interface 102 during any resizing.

To elaborate, the interface resizing system pins elements that exist in more than one quadrant in much the same way that the interface resizing system pins elements that exist only in a single quadrant. In particular, the interface resizing system determines a relationship between the element and the edges of the user selection (e.g., the graphical user interface 102) that form the boundaries of the quadrants in which the element resides. As discussed above, the interface resizing system may determine a distance between an edge or midpoint of the element and each of the edges of the quadrants (e.g., quadrants 103c and 103d) in which the element exists. Accordingly, in response to user input to resize the graphical user interface 102, the interface resizing system also resizes the element to maintain its relationship within the graphical user interface 102—i.e., to maintain its spacing from each edge of the graphical user interface 102.

As shown in FIG. 1, the interface resizing system may detect a cursor location of a cursor 110 operated by a user. In particular, the interface resizing system may detect a coordinate location of the cursor 110 within the workspace 101 based on a horizontal pixel location and a vertical pixel location of the cursor 110. Based on the location of the cursor 110, the interface resizing system generates visual effects for display to the user to illustrate to the user how the interface resizing system interprets an anticipated or possible user action.

For example, in response to detecting that the cursor 110 is located near (e.g., within a threshold number of pixels) handle 104b on the top edge of the graphical user interface 102, the interface resizing system generates a horizontal transverse line 108 that spans the graphical user interface 102 or some other user selection. In particular, the horizontal transverse line 108 spans the graphical user interface 102 and intersects the pivot point 106, displaying a visual representation to the user of a division of the graphical user interface 102—i.e., separating the graphical user interface 102 into two portions by splitting them at the horizontal transverse line 108.

In addition, the interface resizing system displays boxes around the elements 112 in response to detecting that the cursor 110 is near the handle 104b. As illustrated in FIG. 1, the boxes around the elements 112 indicate to the user that the interface resizing system has identified a number of elements 112 within the graphical user interface 102. In response to detecting a user input to select the handle 104b, in some embodiments, the interface resizing system removes the boxes around the elements 112 so that, as the user moves the top edge of the graphical user interface 102 to resize the graphical user interface 102 (as discussed in further detail below with reference to FIG. 2), the interface resizing system avoids cluttering the view of the user. In this way, the interface resizing system more clearly displays the changes in resizing the graphical user interface 102.

Additionally, the interface resizing system generates a different transverse line in response to detecting that the cursor 110 is located near a different handle (e.g., handle 104a or 104d). For example, in response to detecting that the cursor 110 is near handle 104h on the left edge of the graphical user interface 102, the interface resizing system generates a vertical transverse line that indicates to the user that, in response to detecting a user input to select handle 104h, the interface resizing system will separate the graphical user interface 102 into a left portion (e.g., quadrants 103a and 103c) a right portion (e.g., quadrants 103b and 103d). As discussed above, the transverse line spans the graphical user interface 102 and intersects the pivot point 106.

As will be discussed in further detail below with specific reference to FIG. 5, the interface resizing system generates two transverse lines in response to detecting that the cursor 110 is located near a handle that is located on a corner of the user selection (e.g., graphical user interface 102). For example, in response to detecting that the cursor 110 is located near the handle 104g, the interface resizing system generates a horizontal transverse line (e.g., horizontal transverse line 108) and a vertical transverse line (e.g., vertical transverse line 402) to visually separate each quadrant of the graphical user interface.

When the cursor 110 is near handle 104b, the interface resizing system illustrates to the user, by generating the horizontal transverse line 108, that selecting handle 104b will result in the interface resizing system treating the upper portion (e.g., quadrants 103a and 103b) above the vertical position of the pivot point 106 differently from the lower portion (e.g., quadrants 103c and 103d) below the pivot point 106. In particular, in response to detecting a user input indicating a selection of the handle 104b, the interface resizing system binds the quadrants 103 of the graphical user interface 102 to the edges of the graphical user interface 102. More specifically, the interface resizing system binds each quadrant to those edges of the graphical user interface 102 that are adjacent to the given quadrant.

To illustrate by example, the interface resizing system binds quadrant 103a to the top edge and the left edge of the graphical user interface 102. Likewise, the interface resizing system also binds quadrant 103b to the top edge and the right edge of the graphical user interface 102, and the interface resizing system further binds quadrant 103c to the bottom and left edges of the graphical user interface 102, and binds quadrant 103d to the bottom and right edges of the graphical user interface. In addition to binding the quadrants 103 to their respective adjacent edges, the interface resizing system further pins each element in place within each quadrant (including those that cross a boundary between quadrants) as described above.

By binding the quadrants 103 to their adjacent edges, the interface resizing system moves a quadrant (including the elements therein) with any moving edge of the graphical user interface 102 to which the given quadrant is bound. As an example, in response to detecting a user input to move handle 104b in an upward direction away from the pivot point 106, the interface resizing system moves quadrants 103a and 103b in an upward direction in accordance with the user input. More specifically, in some embodiments, the interface resizing system moves quadrants 103a and 103b a vertical distance (e.g., a number of pixels in the vertical direction) equal to the vertical distance of the user input (e.g., the number of pixels moved vertically by the cursor 110).

Indeed, in response to detecting a user input to select handle 104b, the interface resizing system prohibits the selected edge as well as any quadrants (e.g., quadrants 103a and 103b) bound to the selected edge from moving horizontally. To elaborate, the interface resizing system constrains movement of the edges of the graphical user interface 102 and the quadrants 103 based on which handle the user selects. In response to detecting a selection of a handle located on a single edge of the graphical user interface 102 (e.g., handles 104b, 104d, 104f, and 104h), the interface resizing system constrains the movement of the edge on which the handle resides as well as the quadrant(s) bound to the edge to a direction perpendicular to the edge. For instance, the interface resizing system enables the user to select and drag handle 104b, along with its edge and bound quadrants 103a and 103b, vertically up or down, and prevents the user from moving the handle horizontally left or right. Additional detail regarding moving edges and quadrants bound to those edges is provided below with reference to FIG. 2.

In cases where the user selects a handle on a corner of the graphical user interface 102 (e.g., handle 104a, 104c, 104e, or 104g), the interface resizing system binds the quadrants 103 as described above. Additionally, in response to detecting a user input to move the corner of the graphical user interface 102, the interface resizing system moves the quadrants that are bound to the two edges that form the corner. More particularly, the interface resizing system moves the selected handle both along a horizontal dimensional and a vertical dimension. Additional detail regarding the movement of a handle on a corner of the graphical user interface 102 is provided below with reference to FIG. 6.

In some embodiments, the interface resizing system additionally or alternatively highlights a portion of the graphical user interface 102 based on the location of the cursor 110. Though not illustrated in FIG. 1, the interface resizing system may highlight a portion of the graphical user interface 102 that is moveable based on a location of the cursor 110. In other words, the interface resizing system highlights the portion of the graphical user interface 102 that is adjacent to edges of the graphical user interface 102 that intersect the handle near which the cursor 110 is located. For instance, since the cursor in FIG. 1 is near handle 104b, the interface resizing system may highlight quadrants 103a and 103b since those are the two quadrants that are adjacent to the top edge on which handle 104b is located. Similarly, for other handles such as handle 104d, the interface resizing system may highlight quadrant 103b and quadrant 103d because those are the two quadrants adjacent to the right edge on which handle 104d resides.

Figure 2:
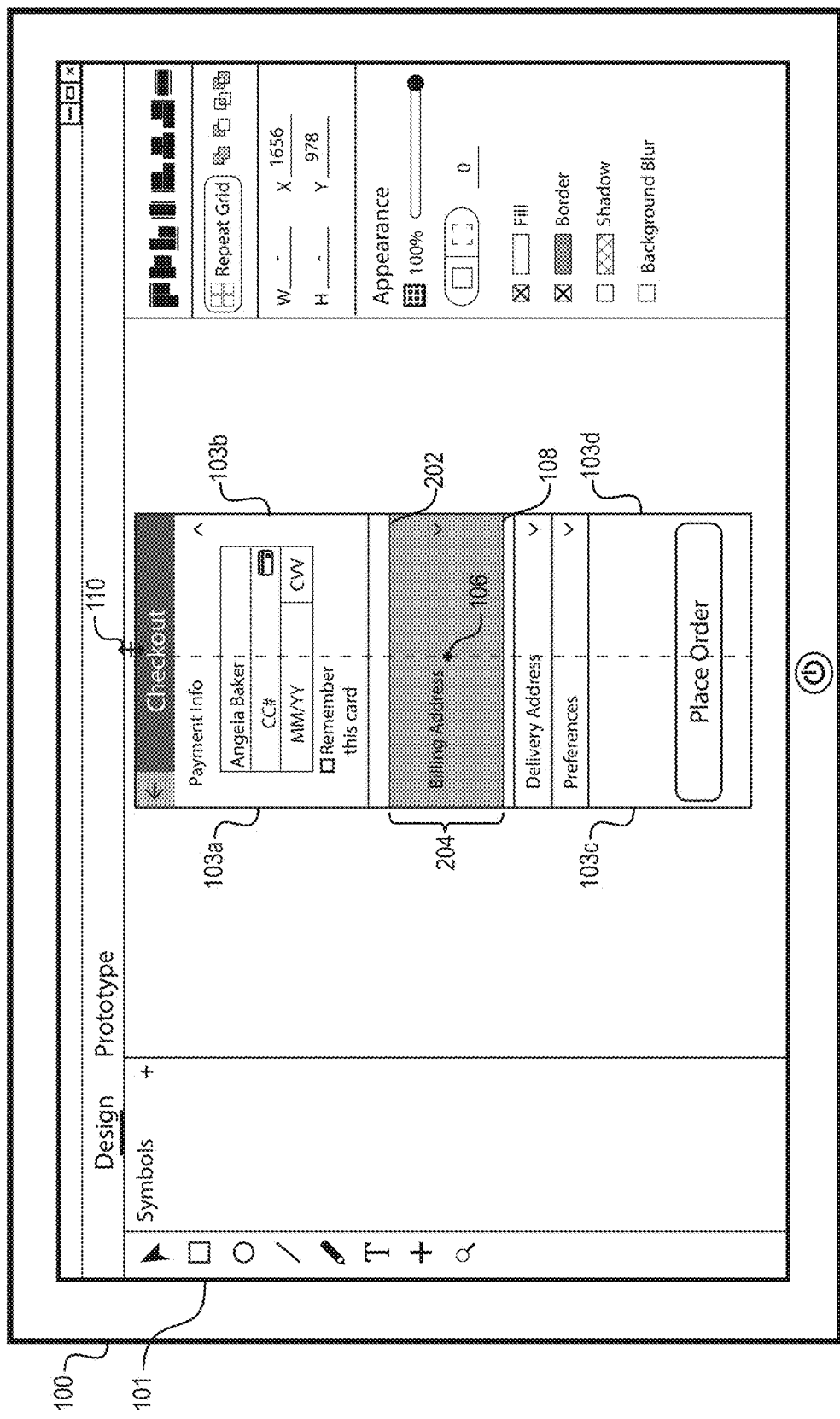
FIGS. 2-8 illustrate resizing the example graphical user interface of FIG. 1 in accordance with one or more embodiments.

FIG. 2 illustrates the digital workspace 101 on computing device 100, similar to FIG. 1. However, FIG. 2 illustrates the graphical user interface 102 as displayed in response to detecting a user input to select and move the handle 104b in a vertical direction upward away from the pivot point 106. In response to detecting the user input, the interface resizing system binds quadrant 103a and quadrant 103b to the selected top edge and moves those bound quadrants together with the selected edge in unison with the user input. For instance, the interface resizing system determines a vertical component of the user input (e.g., a number of a pixels moved in a vertical direction) and moves the bound quadrants 103a and 103b in accordance with the vertical component.

As shown in FIG. 2, the interface resizing system moves quadrants 103a and 103b upward, away from quadrants 103c and 103d, creating a space 204 between the upper quadrants 103a and 103b and the lower quadrants 103c and 103d. The interface resizing system generates, in addition to the horizontal transverse line 108, a boundary line 202 to illustrate the size of the space 204. Additionally, like how the horizontal transverse line 108 depicts an upper boundary of quadrants 103c and 103d, the boundary line 202 depicts a lower boundary of quadrants 103a and 103b. Accordingly, by providing the horizontal transverse line 108 and the boundary line 202, the interface resizing system illustrates the separation between the upper portion (e.g., quadrants 103a and 103b) and lower portion (e.g., quadrants 103c and 103d) of the graphical user interface 102, as compared to their original positions illustrated in FIG. 1. As the user drags the top edge of the graphical user interface 102 upward, the boundary line 202 moves together with the top edge and quadrants 103a and 103b, which are bound to the top edge. The interface resizing system, however, does not move the horizontal transverse line 108.

Indeed, the interface resizing system maintains a position of each quadrant that is not adjacent to a moving edge of the graphical user interface 102. Thus, the interface resizing system keeps quadrants 103c and 103d in place while moving quadrants 103a and 103b upward because, as FIG. 2 illustrates, the top edge is the only moving edge. Accordingly, the interface resizing system moves only quadrants 103a and 103b, which are bound to the moving edge, and the interface resizing system does not move quadrants 103c and 103d, but rather maintains their stationary position, because quadrants 103c and 103d are not bound to a moving edge.

The space 204 between the quadrants 103 indicates a vertical distance of the user input, and further indicates the distance that the interface resizing system moves quadrants 103a and 103b. Particularly, the interface resizing system moves quadrants 103a and 103b upward in response to a user input to move the top edge of the graphical user interface 102, separating the graphical user interface 102 and creating a gap illustrated by space 204. In some embodiments, on the other hand, the space 204 is not a gap depicting a separation of the graphical user interface 102, but is rather a depiction of new space within the graphical user interface 102 to show an expansion of a portion of the graphical user interface 102 at the location of the horizontal transverse line 108. In any case, the interface resizing system increases the size of the graphical user interface 102 in the vertical direction by moving quadrants 103a and 103b upward together and adding space below them above quadrants 103c and 103d.

As shown in FIG. 2, the interface resizing system detects a vertical component of the user input. Generally speaking, the user input has both a horizontal component and a vertical component such as, for example, a number of pixels moved in a horizontal direction and a number of pixels moved in a vertical direction. In response to detecting the user input to select handle 104b on the top edge of the graphical user interface 102, the interface resizing system determines to ignore any horizontal component of the user input while moving the handle 104b, and considers only the vertical component. In particular, the interface resizing system moves the quadrants 103a and 103b vertically up or down in direct correlation with the vertical component of the user input. As shown in FIG. 2, for example, the interface resizing system moves quadrants 103a and 103b upward a distance equal to a vertical component of the user input to create the space 204.

In some embodiments, the interface resizing system highlights the space 204 to indicate that the space 204 is not yet fixed within the graphical user interface 102 while the user input to move the top edge is still taking place. In other words, the interface resizing system enables the user to move the top edge up or down, increasing or decreasing the size of the space 204 during the input. Only upon a completion of the user input (e.g., a release of the mouse or a removal of a finger from a touchscreen) does the interface resizing system add the space 204 to the graphical user interface 102 in response to detecting a release of the user input to move the top edge of the graphical user interface 102. In these or other embodiments, the interface resizing system detects a release of a mouse or a removal of a finger on a touchscreen that indicates a stop to the user input. In response to detecting the release of the user input, the interface resizing system adds the space 204 to the graphical user interface 102 to increase the size of the graphical user interface 102.

As further illustrated by FIG. 2, the elements within each quadrant retain their characteristics/attributes throughout the user input. For example, the interface resizing system maintains the characteristics of elements 112 from FIG. 1 as the interface resizing system moves quadrants 103a and 103b. As seen in FIG. 2, the elements 112 of FIG. 1 retain their relative positioning within each respective quadrant in which each element resides. The elements 112 further retain constant size and shape as the interface resizing system moves quadrants 103a and 103b.

As shown in FIG. 2, the pivot point 106 stays centered in the space 204 as the space 204 changes size with user input. In other words, because the pivot point 106 is centered within the user selection (e.g., the graphical user interface 102), as the interface resizing system moves quadrants 103a and 103b in response to user input, the interface resizing system also moves the pivot point 106 to maintain its percentage position within the user selection. Thus, in FIG. 2, the pivot point 106 stays centrally located within the space 204. Accordingly, the interface resizing system moves the pivot point 106 at a rate slower than the quadrants 103a and 103b. For example, the interface resizing system moves the pivot point 106 so as to keep its position within a given selection boundary proportionally the same with respect to the given boundary. To illustrate, for a pivot point 106 that is centered within a selection boundary, the interface resizing system moves the pivot point 106 at a rate of one half the rate that the interface resizing system moves quadrants 103a and 103b—i.e., for every two pixels that the interface resizing system moves quadrants 103a and 103b in a vertical direction, the interface resizing system moves the pivot point 106 one pixel in the same direction.

As another example, the augmented reality composition system places the pivot point 106 such that the pivot point 106 is not centered within a given selection boundary (e.g., centered between upper quadrants 103a and 103b and lower quadrants 103c and 103d), but is instead placed nearer to the bottom edge of the lower quadrants 103c and 103d. For instance, the augmented reality composition system places the pivot point 106 at a position one-quarter of the total vertical distance (e.g., the vertical distance between the top edge of the upper quadrants 103a and 103b and bottom edge of the lower quadrants 103c and 103d) from the bottom edge and three-quarters from the top edge. In accordance with this placement, the interface resizing system moves the pivot point 106 at a rate of 0.5 pixels for every 2 pixels that the interface resizing system moves the quadrants 103a and 103b in response to user input, so as to maintain the proportional (e.g., percentage) position of the pivot point.

Furthermore, in some embodiments, the interface resizing system analyzes the area around the pivot point 106 within the graphical user interface 102 to identify characteristics of the area. Additionally or alternatively, the interface resizing system analyzes the area around the horizontal transverse line 108 (or other transverse line) to identify characteristics along the transverse line. For example, the area along the horizontal transverse line 108 may have a particular background color, texture, background image, etc. The interface resizing system uses the characteristics of the area along the transverse line (e.g., horizontal transverse line 108) to match the new space (e.g., space 204) added to the graphical user interface 102 to the area around the pivot point 106 for a more seamless integration. As an example, if the horizontal transverse line 108 crosses in an area of solid blue color, the interface resizing system adds space 204 to the such that the solid blue color runs consistently through the new space 204 to match the solid blue color originally around the horizontal transverse line 108.

More specifically, the interface resizing system operates on a display list of vector objects and/or vector elements. Generally, a vector object or vector element refers to a computer-generated graphic whose shape is defined by a path. The shape of the path is determined by points plotted along the path. Thus, in response to detecting an increase (or decrease) in size of a user selection including one or more vector objects or vector elements, each selected vector object or vector element dictates its own increase in size. For instance, in response to detecting an increase in size of a rectangle, the rectangle takes the new space as part of itself. Likewise, in response to detecting an increase in size of a grid or repeated pattern, the grid repeats itself within the new space to fill and remain a contiguous vector graphic that follows its vector path.

Figure 3:
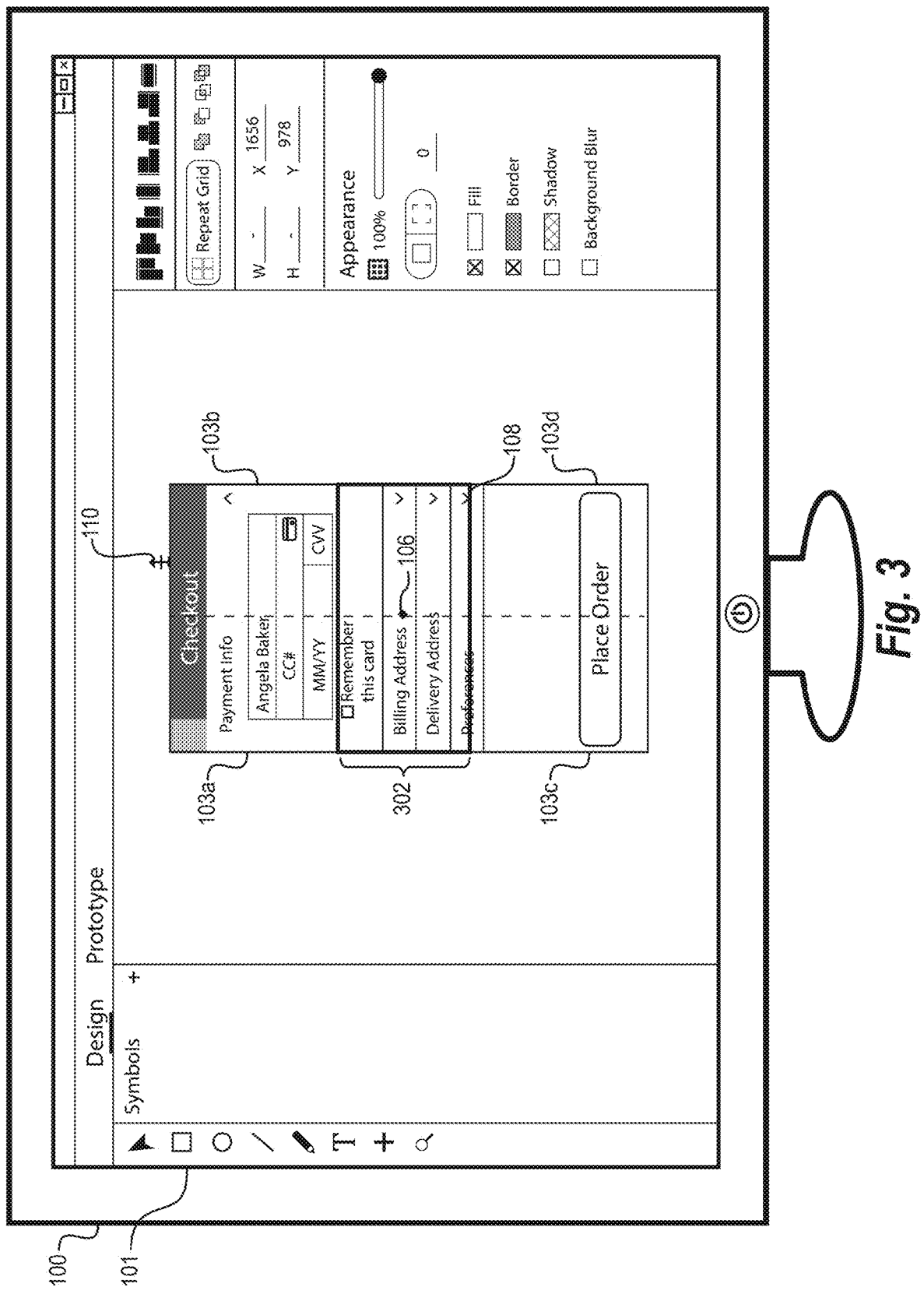

FIG. 3 illustrates movement of the quadrants 103 of the graphical user interface 102 in response to user input to decrease the size of the graphical user interface 102. As shown in FIG. 3, the interface resizing system shrinks the graphical user interface 102 in response to detecting user input to move the top edge of the graphical user interface 102 in a downward direction toward the pivot point. In particular, FIG. 3 illustrates how the interface resizing system decreases the size of the graphical user interface 102 from the size shown in FIG. 2.

For example, the interface resizing system detects a user input to select handle 104b, as discussed above. The interface resizing system further detects a user input to move the top edge of the graphical user interface 102 downward toward the pivot point 106. More specifically, the interface resizing system detects a vertical component of the user input (e.g. a number of pixels moved in the downward direction), and the interface resizing system moves quadrants 103a and 103b downward with the selected edge accordingly.

As illustrated in FIG. 3, the graphical user interface 102 includes a section of overlapping space 302. In particular, overlapping space 302 indicates an amount that the interface resizing system shrinks the graphical user interface 102. The top boundary of the overlapping space 302 indicates a location at which the bottom edges of quadrants 103a and 103b started when the user began to drag the top edge of the graphical user interface 102 downward. The bottom boundary of the overlapping space 302, illustrated as horizontal transverse line 108, indicates a location to which the interface resizing system moves the bottom edge of quadrants 103a and 103b, overlapping quadrants 103c and 103d, respectively. Accordingly, the vertical length of the overlapping space 302 is the vertical distance of the user input and also the vertical distance of the space that the interface resizing system removes from the graphical user interface 102.

To that end, the interface resizing system removes the overlapping space 302 from the graphical user interface 102. As discussed above with reference to FIG. 2, in some embodiments, the interface resizing system removes the overlapping space 302 upon detecting a release of the user input. As also discussed above, a vector graphic (e.g., a vector element or vector object) resizes based on its defined vector path in response to user input to decrease its size. Accordingly, as the user maintains the user input (e.g., continuously depresses a mouse click or continuously maintains finger contact with a touchscreen), the interface resizing system moves the quadrants 103a and 103b up or down, increasing or decreasing the size of the overlapping space 302 with the user input. Upon detecting a release of the user input, the interface resizing system removes the overlapping space 302 from the graphical user interface 102, decreasing the size of the graphical user interface.

In extreme cases where, for example, an element within quadrant 103a (e.g., element 112b) crosses entirely into quadrant 103c in response to user input to decrease the size of the graphical user interface 102, the interface resizing system continues to move and scale in accordance with the rules associated with quadrant 103*a* (e.g., the quadrant in which the element 112*b* was located with the scale/movement operation began), as described above. Additionally, the interface resizing system prevents elements from moving beyond (e.g., outside) the user selection boundary. For example, if the interface resizing system detects a user input to decrease the size of the graphical user input 102 to the point where the element 102*b* would cross into quadrant 103*c* and then further cross out of quadrant 103*c* were the interface resizing system to continue to scale/move the element 112*b* in the same manner, the interface resizing system instead prevents the element 112*b* from crossing beyond the edge of quadrant 103*c*. Accordingly, as a user selection gets very small, the interface resizing system first prevents the elements from translating outside a selection boundary. Furthermore, if the user input continues until the selection size is smaller than the relevant dimension of an element (e.g., element 112*b*), the interface resizing system reduces the size of the element.

Similar to the discussion above in FIG. 2, the interface resizing system does not move quadrants 103*c* and 103*d* in response to detecting the user input to resize the graphical user interface 102 illustrated in FIG. 3. Rather, the interface resizing system maintains the position of quadrants 103*c* and 103*d* and instead moves quadrants 103*a* and 103*b* downward with the user input. Accordingly, the horizontal transverse line 108 also moves downward with the user input as the overlapping space 302 grows.

In some embodiments, the interface resizing system removes the overlapping space 302 from the non-moving quadrants. More particularly, the interface resizing system removes the overlapping space only from quadrants 103*c* and 103*d*, and maintains the size of quadrants 103*a* and 103*b*. In these embodiments, the interface resizing system maintains the size of the moving quadrants (e.g., the quadrants 103*a* and 103*b* that are bound to the moving top edge of the graphical user interface 102) and adjusts the size of the non-moving quadrants.

In other embodiments, the interface resizing system removes some other space from the graphical user interface 102—i.e., the interface resizing system removes a space equal in size to the overlapping space 302, but does not necessarily remove the portion of the graphical user interface 102 shown within the overlapping space 302 itself. Indeed, in these embodiments, the overlapping space 302 represents an amount of space that the interface resizing system removes but does not represent the actual removed space itself.

To illustrate, the interface resizing system removes space from the graphical user interface 102 based on various factors. For example, the interface resizing system analyzes the graphical user interface 102 to identify elements (e.g., elements 112) therein, as discussed above. The elements 112 have various characteristics or attributes such as positions or placements within quadrants 103 of the graphical user interface 102. To prevent removal of, or other undesirable alterations to, the elements 112 within the graphical user interface 102 (e.g., moving an element by changing the distance between an element and one or more of the edges of the graphical user interface 102), the interface resizing system determines portions of the graphical user interface that are devoid of elements 112 and that may be removed without deleterious effects.

For example, as illustrated in FIG. 3, the graphical user interface 102 contains a portion of empty space that has no elements 112 within it (e.g., the space above the "Place Order" element, numbered 112*e* in FIG. 1). Thus, to maintain the relationships and attributes of the elements 112, the interface resizing system analyzes the graphical user interface 102 to identify the empty space, and removes a portion of the empty space that is the size of the overlapping space 302.

In these or other embodiments, the interface resizing system removes a portion of space based on a location of the pivot point 106. To illustrate, the interface resizing system scales objects or elements that intersect a horizontal and/or vertical position of the pivot point 106 based on the direction of the user input—i.e., the interface resizing system grows or shrinks the object/element proportionally to the size (e.g., distance) of the user input, regardless of the size of that user input. Based on placing the pivot point 106 in a region devoid of objects/elements, the interface resizing system will not scale any objects or elements because none will intersect a horizontal and/or vertical position of the pivot point 106.

In some embodiments, the interface resizing system removes a space that is the size of the overlapping space 302 equally from the moving portion (e.g., quadrants 103*a* and 103*b*) and the non-moving portion (e.g., quadrants 103*c* and 103*d*) of the graphical user interface 102. For example, the interface resizing system identifies a portion of quadrants 103*a* and 103*b* that is devoid of elements 112, and further identifies a portion of quadrants 103*c* and 103*d* that is also devoid of elements 112. Accordingly, the interface resizing system removes space equal in size to the overlapping space 302 from quadrants 103*a* and 103*b* and quadrants 103*c* and 103*d*, where half of removed space is in quadrants 103*a* and 103*b* and the other half is in quadrants 103*c* and 103*d*. In other embodiments, the interface resizing system removes different amounts of space from quadrants 103*a* and 103*b* than from 103*c* and 103*d*, not necessarily keeping the removal of space even between the moving and non-moving portions of the graphical user interface 102.

As discussed above with reference to FIG. 2, the interface resizing system moves the pivot point 106 to keep it in the center of the changing space (e.g., the overlapping space 302). More specifically, the interface resizing system moves the pivot point 106 downward to keep it in the center of the overlapping space 302. As an example, the interface resizing system moves the pivot point downward at one-half the rate of the vertical component of the user input to resize the graphical user interface 102, which mechanics are discussed in more detail above with reference to FIG. 2.

Figure 4:
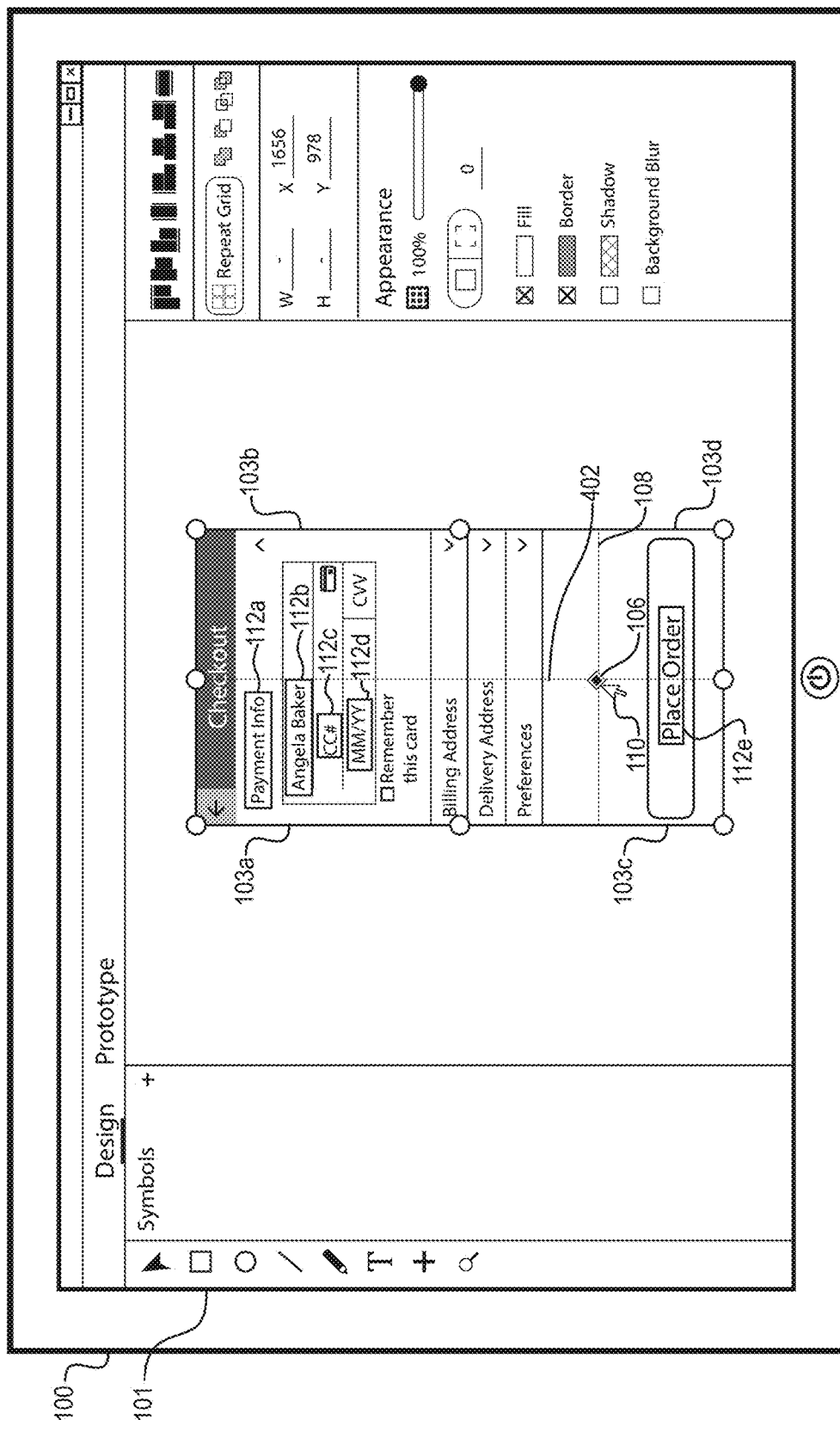

FIG. 4 illustrates the graphical user interface 102 where the user moves the location of the pivot point 106. In particular, the interface resizing system detects a user input to select the pivot point 106. In response to detecting the selection of the pivot point 106, the interface resizing system displays the horizontal transverse line 108 and further displays a vertical transverse line 402 to depict the segmentation of the quadrants 103 of the graphical user interface 102, and to depict the location of the pivot point 106 at the intersection of the lines. The vertical transverse line 402 spans the graphical user interface 102 from top to bottom and intersects the horizontal transverse line 108 at the pivot point 106.

As the user moves (e.g., drags) the pivot point 106 to a new location with cursor 110, as shown in FIG. 4, the interface resizing system moves the horizontal transverse line 108 and the vertical transverse line 402 with the pivot point 106. In other words, the interface resizing system displays the horizontal transverse line 108 and the vertical transverse line 402 to always intersect at the pivot point 106.

After moving the pivot point 106, the horizontal transverse line 108, and the vertical transverse line 402, the interface resizing system analyzes the graphical user interface 102 to identify those elements 112 that exist within each of the quadrants 103. As an example, the interface resizing system analyzes the graphical user interface 102 to determine that element 112a exists within quadrant 103a, that element 112b also exists within quadrant 103a, that element 112e exists within quadrants 103c and 103d, etc. As described above, the interface resizing system determines the placement and spacing of each of the elements 112 within the graphical user interface 102 to maintain that placement and spacing throughout resizing the graphical user interface 102.

As illustrated in FIG. 4, the interface resizing system creates quadrants 103 of different sizes in response to user input to move the pivot point 106. Indeed, as described above, the pivot point 106 delineates the quadrants 103 of the graphical user interface 102. Accordingly, when the interface resizing system moves the pivot point 106 in response to detecting a user input to do so, the interface resizing system also resizes the quadrants 103. In particular, FIG. 4 illustrates that quadrants 103a and 103b are the same size, and that each of quadrants 103a and 103b are larger than quadrants 103c and 103d, which are also the same size. Since the interface resizing system in FIG. 4 moves the pivot point 106 in only a vertical direction directly downward, quadrants 103a and 103 remain the same size, as do quadrants 103c and 103d. If, for example, the user clicks and drags the pivot point 106 in a horizontal direction as well as a vertical direction, the interface resizing system creates quadrants 103 of different sizes where quadrant 103a may be a different size than quadrant 103b, and may further be a different size than quadrants 103c and 103d.

In any case, the interface resizing system analyzes each of quadrants 103 to identify elements 112 therein, and to further determine attributes and relationships of each element. For example, the interface resizing system determines a distance from each element and the edges of the quadrant in which is it located to define a placement for each element. After determining these attributes and relationships, as discussed above, the interface resizing system maintains those relationships with respect to each of quadrants 103, regardless of the size of each quadrant.

Figure 5:
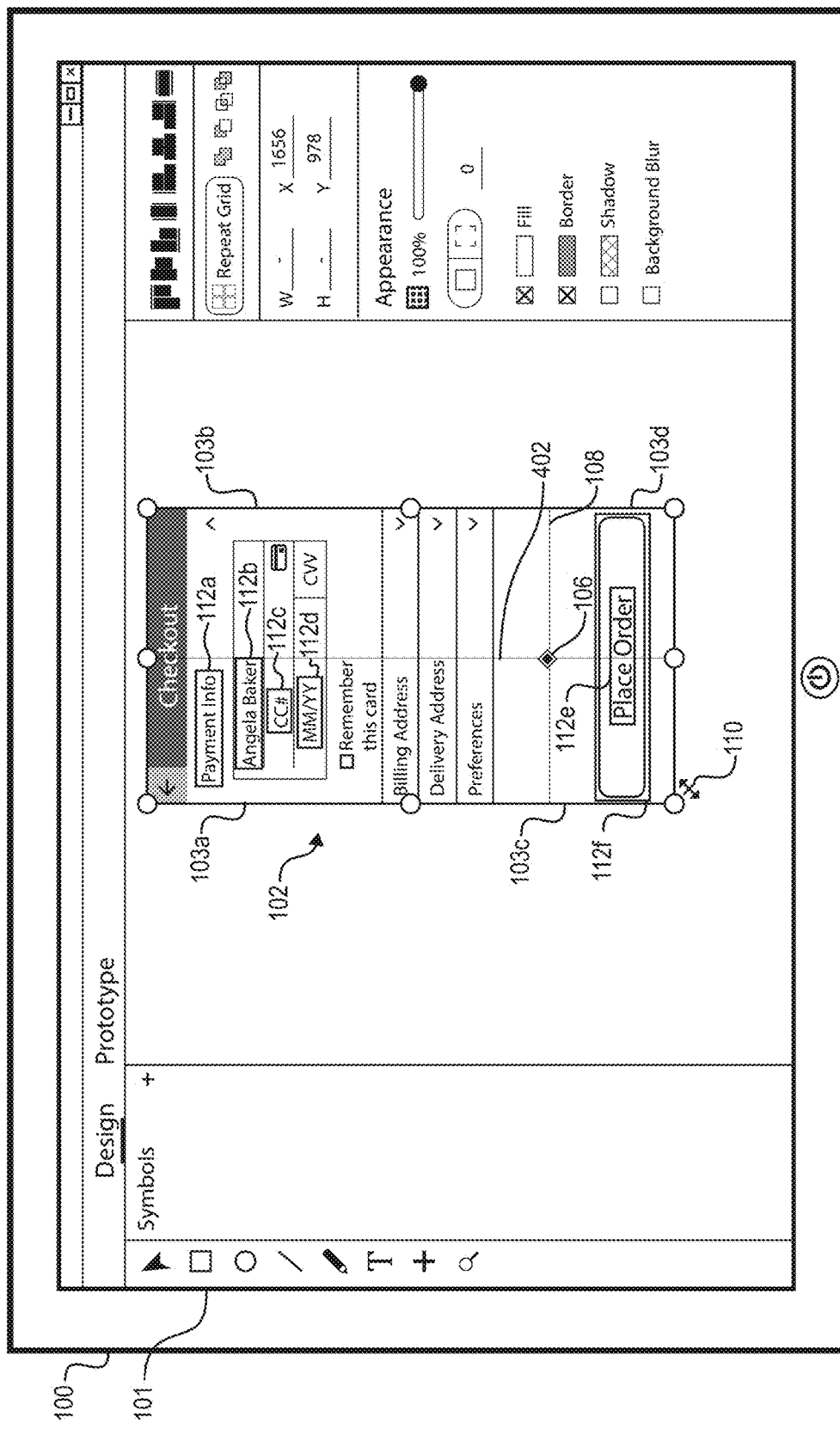

FIG. 5 illustrates the graphical user interface 102 as a result of the user moving the cursor 110 to hover over or near handle 104g, on the lower-left corner of the graphical user interface 102. As described above, the interface resizing system interprets interactions with a corner (e.g., interactions with a handle placed on a corner) of the graphical user interface 102 as interactions with the two edges of the graphical user interface 102 that make up the particular corner. Thus, as shown in FIG. 5, the interface resizing system detects that the cursor 110 is located near handle 104g, which indicates a potential selection of the left edge and the bottom edge of the graphical user interface 102.

Accordingly, the interface resizing system displays the horizontal transverse line 108 and the vertical transverse line 402 to depict the segmentation of the quadrants 103 to the user. The interface resizing system further highlights the elements 112 by outlining each of the identified elements 112 or, in some embodiments, by changing a color of the elements 112 or by adding a highlight color, etc.

In any event, in response to detecting a user input to select the handle 104g, the interface resizing system binds the quadrants 103 to their respective edges. More specifically, as described above, the interface resizing system binds quadrant 103a to the top edge and the left edge of the graphical user interface 102, quadrant 103b to the top edge and the right edge of the graphical user interface 102, quadrant 103c to the bottom edge and the left edge of the graphical user interface 102, and quadrant 103d to the bottom edge and the right edge of the graphical user interface 102. By binding the quadrants 103 in this way, the interface resizing system keeps each quadrant and its contents (e.g., elements) intact, and enables the user to move each quadrant independently of the others to resize the graphical user interface 102.

As mentioned, in further response to detecting a user input to select the lower-left corner of the graphical user interface 102, the interface resizing system determines a location of each of the elements 112 (e.g., based on their respective centroids) with respect to the location of the pivot point 106. Depending on the location of a given element, the interface resizing system applies rules to either move or scale (e.g., resize) the element. To illustrate, the interface resizing system determines that element 112a is located entirely within quadrant 103a, whereas element 112e crosses the boundary between quadrants 103c and 103d (i.e., crosses the vertical transverse line 402). Thus, in response to detecting a user input to move the lower-left corner, the interface resizing system moves element 112a by a percentage of the movement of the lower-left corner so as to keep element 112a in a consistent percentage position relative to the edges of the user selection (e.g., the graphical user interface 102). In contrast, the interface resizing system scales the element 112e in response to detecting user input to move the lower-left corner horizontally. Thus, the centroid of the element 112e does not change location, but the interface resizing system scales element 112e in accordance with the horizontal component of the user input.

Figure 6:
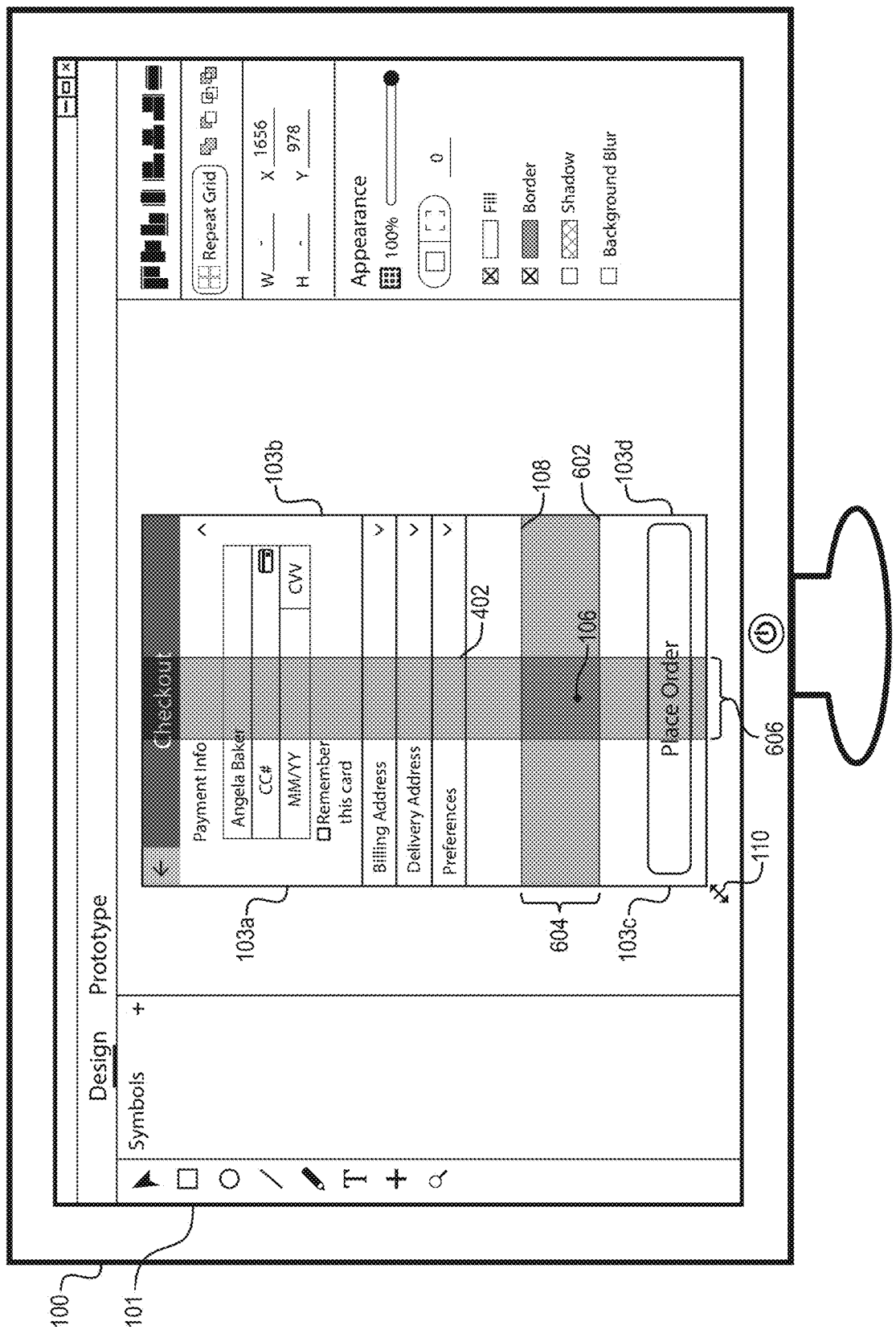

Indeed, as illustrated in FIG. 6, the interface resizing system moves each quadrant bound to the left edge and each quadrant bound to the bottom edge of the graphical user interface 102. As discussed above, since the user moves the lower-left corner down and to the left—i.e., in two dimensions—the interface resizing system moves quadrant 103a horizontally to the left, moves quadrant 103d vertically downward, and moves quadrant 103c down and to the left. The interface resizing system keeps quadrant 103b in place because quadrant 103b is not adjacent to a moving edge.

Generally, the interface resizing system implements horizontal movement using a different sign than vertical movement so that movement in one dimension is independent of the other. To illustrate from FIG. 6, the interface resizing system moves quadrants 103a and 103c to the left while also moving quadrants 103c and 103d downward in accordance with user input to move the lower-left corner diagonally down and to the left. If, on the other hand, the interface resizing system detects user input to select the upper-right corner and move the corner diagonally down and to the right, the interface resizing system can move quadrants 103a and 103b downward while also moving quadrants 103b and 103d to the right. Thus, depending on which corner of the graphical user interface (e.g., graphical user interface 102 of FIG. 5) is selected, the interface resizing system can resize the graphical user interface (or other user selection) in a horizontal dimension and a vertical dimension, independently of each other.

To illustrate, since the lower-left corner of the graphical user interface 102 is comprised of the left edge and the bottom edge, the interface resizing system moves quadrants bound to the left edge (e.g., quadrants 103a and 103c) in response to detecting user input to move the left edge. The interface resizing system also moves quadrants bound to the bottom edge (e.g., quadrants 103c and 103d) in response to detecting user input to move the bottom edge. Likewise, if the interface resizing system detects a user input to move a different corner of the graphical user interface 102, the interface resizing system moves the quadrants 103 bound to the edges that make up the selected corner.

Furthermore, as the interface resizing system moves quadrants 103a, 103c, and 103d, the interface resizing system also moves the elements 112 located therein, and maintains the relative position of each of the elements 112 within their respective quadrants. To illustrate from FIG. 6, the interface resizing system keeps element 112a in its respective position within quadrant 103a as quadrant 103a moves to the left. Likewise, the interface resizing system maintains the relative position of elements 112b, 112c, and 112d within quadrant 103a as well. Indeed, in some embodiments, the interface resizing system identifies elements 112b, 112c, and 112d as a set and therefore moves the set of elements 112b-112d together to maintain positions relative to each other as well as to the edges of the quadrant 103a.

As further discussed above, the interface resizing system also scales elements that cross a boundary between two or more elements. As an example, because element 112f exists within quadrant 103c and 103d, the interface resizing system scales element 112f to maintain its spacing relative to the left edge, the bottom edge, and the right edge of the graphical user interface 102. That is to say, the interface resizing system stretches element 112f horizontally in accordance with the horizontal component of the user input. Accordingly, the element 112f retains is spacing from edges of the quadrants 103c and 103d in which it resides.

Furthermore, the interface resizing system maintains the font size of the element 112e as well as its relative position within element 112f as the user resizes the graphical user interface 102. In particular, even though element 112e crosses a boundary between quadrants 103c and 103d, the interface resizing system nonetheless identifies that element 112e is a text label and, to retain consistency with the other text within the graphical user interface 102, the interface resizing system does not scale the element 112e but rather maintains its characteristics such as font size and shape. Thus, the interface resizing system may rank or prioritize factors to determine whether to scale an element that crosses a boundary between quadrants 103. In particular, the interface resizing system may rank attributes such as font size and element shape as more important than attributes such as spacing of the element from a given edge of a quadrant. Additionally or alternatively, the interface resizing system may determine that, because element 112e is located within another element 112f that crosses the boundary between quadrants 103c and 103d, then the outermost element (e.g., the element 112f in which the other element 112e resides) is the element to scale, and the inner element may remain the same size. Nevertheless, the interface resizing system maintains the relative position of the element 112e within element 112f.

In moving the quadrants 103a, 103c, and 103d that are adjacent to the moving edges of the graphical user interface 102, the interface resizing system creates new space to add between the quadrants 103. For instance, as the interface resizing system moves quadrants 103c and 103d downward with the vertical component of the user input, the interface resizing system creates space 604 between quadrants 103c and 103d and quadrants 103a and 103b. Space 604 indicates an amount of space that the interface resizing system adds in the vertical dimension.

In addition, as shown in FIG. 6, the horizontal transverse line 108 is illustrated to show the bottom boundary of quadrants 103a and 103b, and to further show the point at which the top edge of quadrants 103c and 103d began before the user slid the bottom-left corner of the graphical user interface 102 down and to the left (e.g., as shown in FIG. 5). Accordingly, boundary line 602 illustrates the top boundary of quadrants 103c and 103d. Similarly, FIG. 6 illustrates space 606 that indicates the horizontal component of the user input in moving the bottom-left corner of the graphical user interface 102 down and to the left. Additionally, the space 606 represents the new space that the interface resizing system adds to the graphical user interface to resize the graphical user interface in response to the user input.

As further illustrated in FIG. 6, the interface resizing system moves the pivot point 106 with the user input to stay centered within the new space that the interface resizing system adds (e.g., in accordance with vector graphics principles, as described above) to the graphical user interface 102. More specifically, the interface resizing system moves the pivot point 106 in relation to a proportional (e.g., percentage) position within given selection bounds (e.g., the graphical user interface 102). Indeed, as illustrated in FIG. 6, the interface resizing system moves the pivot point at a rate that is a particular percentage of the rate at which the interface resizing system moves the selected corner. To illustrate, since the pivot point is centered between the leftmost edge of the graphical user interface 102 (e.g., the user selection) and the rightmost edge of the graphical user interface 102, the interface resizing system moves the pivot point 106 horizontally at a rate of one-half the horizontal movement of the selected corner. Thus, for every two pixels the interface resizing system moves the selected corner to the left (e.g., in response to user input), the interface resizing system moves the pivot point 106 one pixel to the left.

With relation to the vertical movement of the pivot point 106, as shown in FIG. 6, the pivot point 106 is located at one quarter of the distance up from the bottom edge of the graphical user interface 102 (e.g., the user selection), which means that it is three quarters down from the top edge of the graphical user interface 102. Accordingly, the interface resizing system moves the pivot point 106 vertically downward at a rate of three-quarters of the rate that the interface resizing system moves the selected corner vertically downward. By moving the pivot point at a rate that is based on its percentage position within the user selection, the interface resizing system maintains the percentage position of the pivot point 106 within the user selection (e.g., the graphical user interface 102) throughout any resizing operation.

Figure 7:
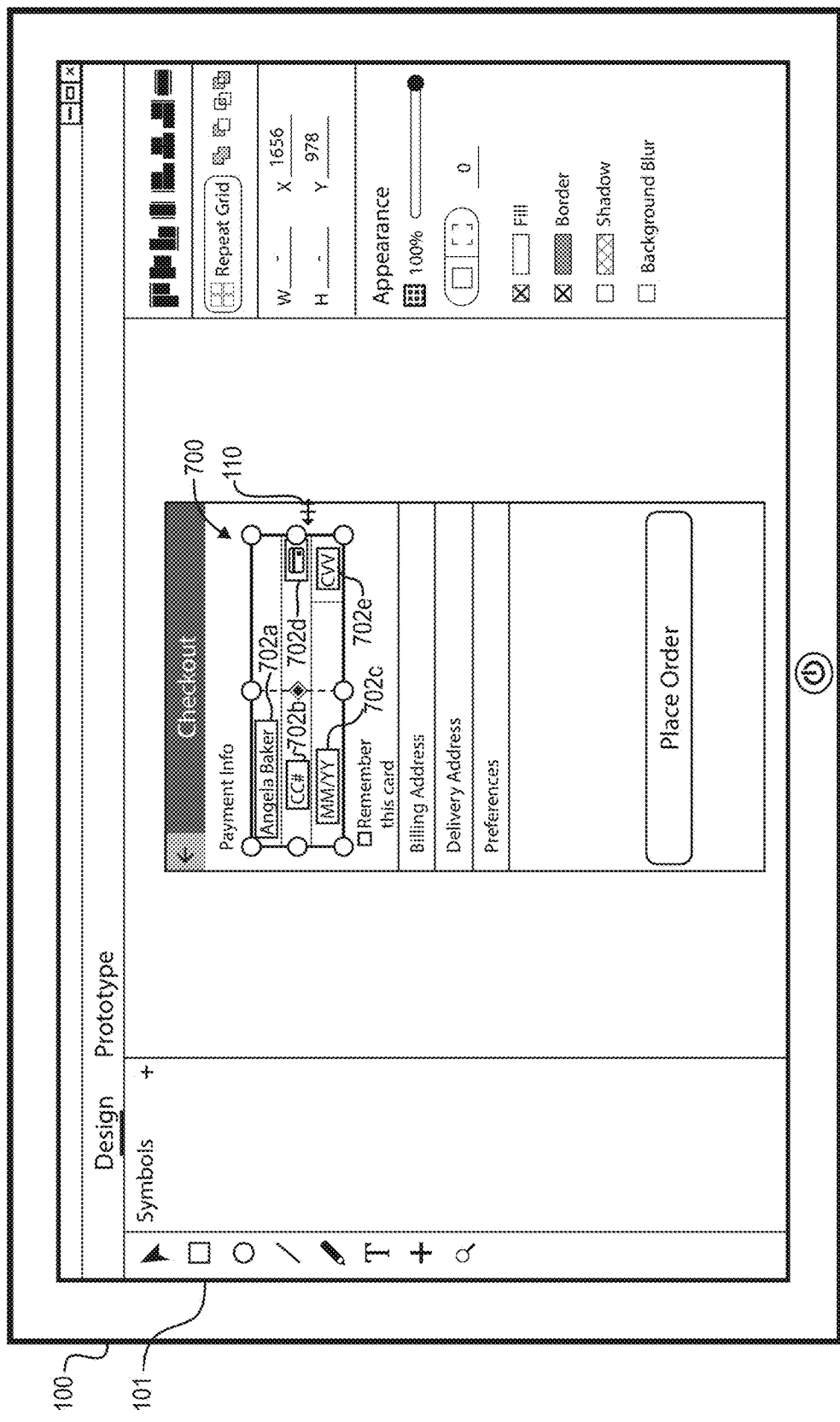

FIG. 7 illustrates the graphical user interface 102 in response to the interface resizing system detecting a user input to select an object within the graphical user interface 102 (e.g., an object that is less than the entire graphical user interface 102). In particular, as shown in FIG. 7, the interface resizing system detects a user input to select the object 700 containing the user's name and payment information, including a space for entering a credit card number, CVV number, date, etc. As discussed above, the interface resizing system detects the user input to select the object 700 and displays handles to enable the user to select and/or move one or more of the edges of the object 700.

Additionally, the interface resizing system segments the object 700 into quadrants, as discussed above. Particularly, the interface resizing system partitions the four quadrants of the object based on the location of the pivot point, where the vertical coordinate of the pivot point defines the upper boundary of the two lower quadrants, and defines the lower boundary of the two upper quadrants. Similarly, the horizontal coordinate of the pivot point defines the left boundary of the two quadrants on the right side, and further defines the right boundary of the two quadrants on the left side of object 700.

In addition, the interface resizing system analyzes the selected object 700 to identify elements 702a, 702b, 702c, 702d, and 702e (referred to herein collectively as "elements 702"). In some embodiments, the interface resizing system does not automatically identify the elements 702, but instead receives user input to select each of the elements 702. In particular, the user may desire to resize or otherwise adjust each of elements 702 uniformly together, even if the elements 702 are not part of a set (or do not have any obvious visual relationship) identified by the interface resizing system. Thus, the interface resizing system may receive user input to group the elements 702 together so that the interface resizing system performs operations on the elements 702 together as a group.

To identify the elements 702, the interface resizing system analyzes the object 700 to determine in which quadrants the elements 702 reside. To illustrate, the interface resizing system may determine that element 702a is located in the upper-left quadrant of the object 700. In addition, the interface resizing system may determine that the element 702b is located both within the upper-left quadrant as well as the lower-left quadrant of the object 700—i.e., element 702b crosses the boundary between the quadrants. Furthermore, the interface resizing system determines that the element 702c is located in the lower-right quadrant, determines that the element 702d crosses the boundary between the upper-right quadrant and the lower-right quadrant, and determines that element 702e is located in the lower-right quadrant.

As discussed above, the interface resizing system further determines relationships and attributes of each of the elements 702. To illustrate, the interface resizing system determines a proportional placement of the element 702a within the upper-left quadrant so that, in response to detecting user input to resize the object 700, the interface resizing system maintains the proportional placement of the element 702a within the upper-left quadrant. In addition, the interface resizing system scales objects that cross the boundary between quadrants. For instance, the interface resizing system may identify the boxes that contain elements 702a, 702b, and 702c as elements that cross the boundaries between quadrants.

Figure 8:
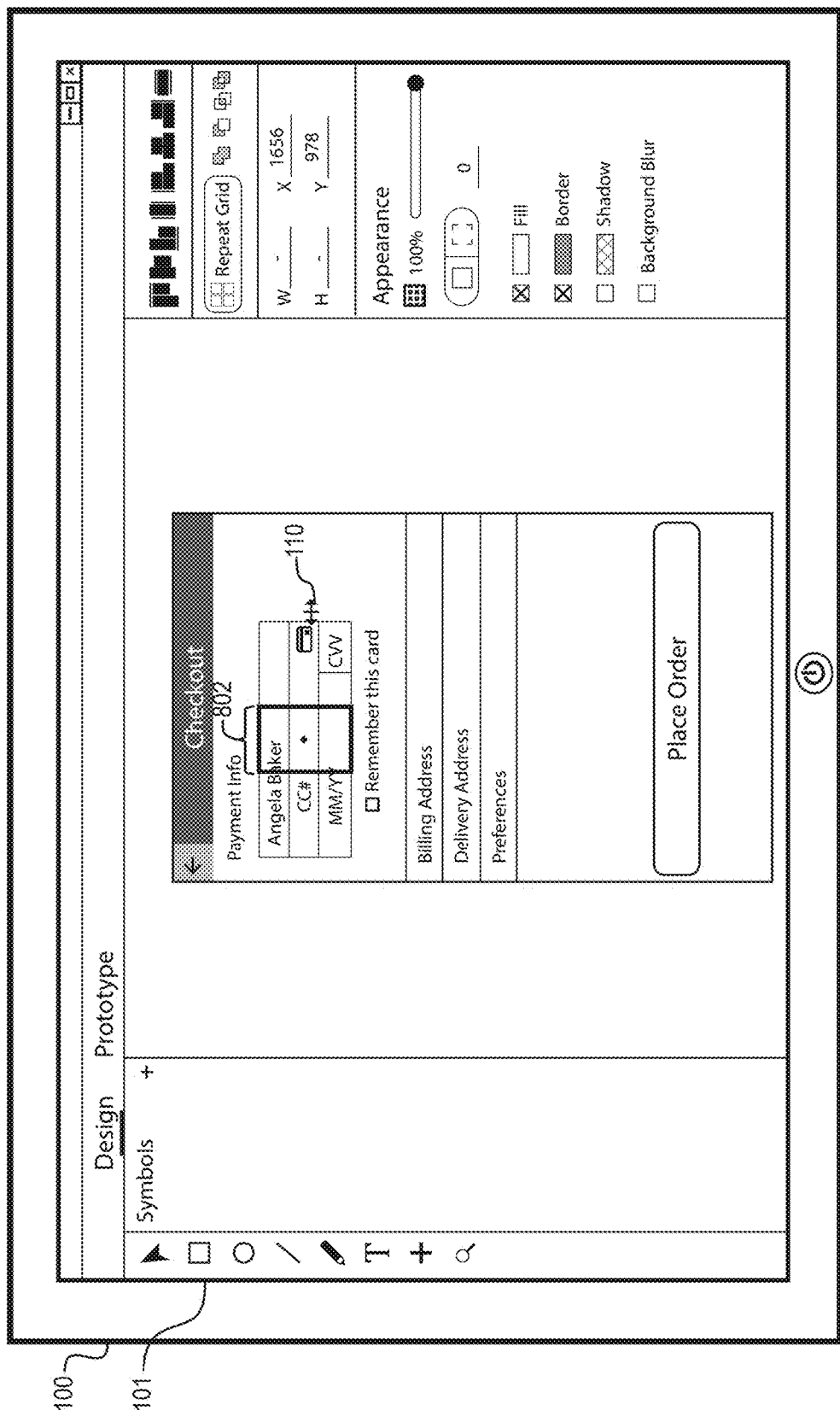

To illustrate from FIG. 8, in response to detecting user input to resize the object 700, the interface resizing system scales the boxes to increase or decrease their size, depending on the direction of the user input. Indeed, as illustrated in FIG. 8, the interface resizing system decreases the size of the object 700 by collapsing the object 700 to the left in response to detecting user input to move the right edge of the object 700 toward the pivot point.

To resize the object 700, the interface resizing system detects a user input to select and move one or more edges of the object 700. As discussed above, in response to detecting a user input to select the right edge of the object 700 (e.g., to select the handle on the right edge), the interface resizing system binds the quadrants of the object 700 to their respective edges. Furthermore, the interface resizing system pins the elements 702 to maintain the proportional placement of the elements 702 within their respective quadrants (or to scale the elements 702 accordingly). Indeed, as shown in FIG. 8, as the interface resizing system moves the right edge of the object 700 to the left (e.g., toward the pivot point), the interface resizing system collapse the two quadrants on the right into the two quadrants on the left in accordance with a horizontal component of the user input.

As the user drags the right edge of the object 700, the interface resizing system generates an overlapping space 802 to depict the amount of space that the interface resizing system will remove from the object 700 (e.g., upon release of the mouse or finger). As the user moves the right edge of the object 700 farther to the left, the interface resizing system increases the size of the overlapping space 802. On the other hand, as the user moves the right edge to the right, the interface resizing system decreases the size of the overlapping space 802.

Furthermore, as shown in FIG. 8, the interface resizing system maintains the placement of elements 702 within their respective quadrants, and further scales those elements that cross a boundary between quadrants, so long as the interface resizing system determines that they are elements that should be scaled. Indeed, as described above, the interface resizing system does not scale some elements that cross a boundary between quadrants because, in some cases, the elements contain text that needs to remain constant for aesthetic appearance and consistency with other text within the object 700.

Figure 9:
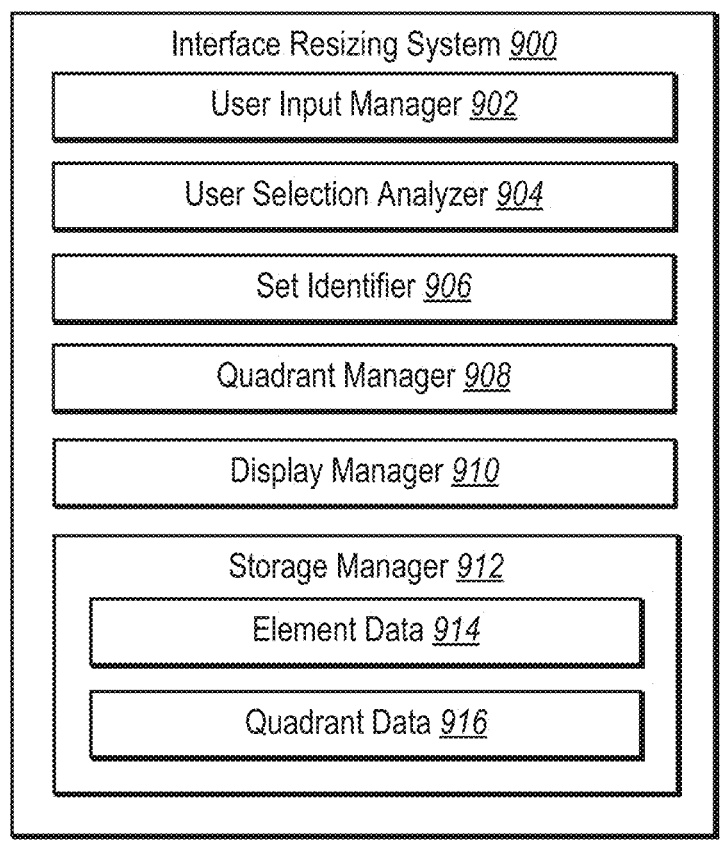
FIG. 9 illustrates an example schematic diagram of an interface resizing system in accordance with one or more embodiments.

FIG. 9 illustrates a block diagram of various components associated with the interface resizing system. In particular, FIG. 9 illustrates an example embodiment of interface resizing system 900 (e.g., the interface resizing system referenced and describe above) and the functionality of its various components. As shown, the interface resizing system 900 may include, but is not necessarily limited to, a user input manager 902, a user selection analyzer 904, a set identifier 906, a quadrant manager 908, a display manager 910, and a storage manager 912. Although FIG. 9 illustrates a particular number of components in a particular arrangement, it will be understood from the disclosure herein that, in some embodiments, the interface resizing system 900 may include more or fewer components, and the components may be in additional or alternative arrangements. Furthermore, in some embodiments, the components described hereafter may perform additional or alternative tasks to enable the interface resizing system 900 to perform the functions described above with reference to FIGS. 1-8.

As mentioned, the interface resizing system 900 includes a user input manager 902. In certain embodiments, the user input manager 902 receives user input by way of, for example, a mouse, keyboard, touchscreen, or other user input device. In response to receiving user input, the user input manager 902 communicates with other components of the interface resizing system 900 to perform tasks based on the user input. For example, the user input manager 902 communicates with the user selection analyzer 904 to transmit data related to a user selection (e.g., an object within a graphical user interface). To illustrate, the user input manager 902 may transmit information indicating a click input to select an object, or else may transmit information indicating a click-and-drag input to select a particular area within an object or graphical user interface.

The user input manager 902 may also distinguish between various inputs from the user. For instance, the user input manager 902 identifies a user input to select a handle on an object (e.g., a click or tap), and the user input manager further identifies a user input to move the handle on the object (e.g., a drag or other movement input). Furthermore, the user input manager 902 receives and identifies information related to cursor location. For example, the user input manager 902 identifies the location of the cursor, and in response to detecting that the cursor is located on or near a handle or other user-selectable item, the user input manager 902 communicates with the user selection analyzer 904 and/or the display manager 910 to display, for example, boxes highlighting the various elements identified within the user selection and/or to display one or more transverse lines, as described above.

As further illustrated by FIG. 9, the interface resizing system 900 includes a user selection analyzer 904. The user selection analyzer 904 may receive an indication from the user input manager 902 of a user selection (e.g., an object). In response to receiving the indication of the user selection, the user selection analyzer 904 analyzes the user selection (e.g., object) to identify elements within the selection. Additionally, the user selection analyzer 904 communicates with, for example, the set identifier 906 and the display manager 910 to transmit information about the identified elements. For example, in response to receiving information pertaining to the identified elements, the display manager 910 may highlight each identified element within the user selection by, for example, placing a box around each identified element.

In addition to identifying elements within the user selection, the user selection analyzer 904 further identifies quadrants within the user selection. To illustrate, the user selection analyzer 904 utilizes a location of the pivot point as a delineator between the four quadrants within the user selection, as described above. Thus, the user selection analyzer 904 determines a horizontal location and a vertical location of the pivot point and defines the boundaries of the quadrants based on those locations. For example, the vertical location of the pivot point represents the boundary between the upper two quadrants and the lower two quadrants, while the horizontal location of the pivot point represents the boundary between the left two quadrants and the right two quadrants.

Based on segmenting the user selection into quadrants, the user selection analyzer 904 further determines the placement of each identified element within each quadrant, and further determines whether each element crosses a boundary between quadrants. If an element crosses a boundary between quadrants, the user selection analyzer 904 communicates with the set identifier 906 to relay information as to which boundary the element crosses and/or the two quadrants in which the element is located. Indeed, the user selection analyzer 904 relays information pertaining to the quadrant in which each element is located to the set identifier 906.

In response to receiving information from the user selection analyzer 904, the set identifier 906 determines relationships and attributes of elements. Particularly, the set identifier 906 utilizes the information gathered by the user selection analyzer 904 to determine a location of each element relative to the location of the pivot point. For instance, the set identifier 906 determines the location of the centroid of each element relative to the location of the pivot point. Based on these locations, the set identifier 906 further determines relationships between elements such as, for example, an alignment (e.g., a vertical alignment or a horizontal alignment) of the elements.

Beyond determining an alignment of an element, the set identifier 906 further identifies a context of the element. For example, the set identifier 906 determines a location of the element relative to other elements (e.g., whether the element is located within another element). In response to determining that two or more elements share an alignment within a given context (e.g., two elements inside the same box), the set identifier 906 identifies a set composed of the two or more elements. To elaborate, the set identifier 906 determines that the relationship between the two elements is significant because the elements share an alignment within a given context. Therefore, the set identifier 906 determines that a scaling or movement operation should affect each element within the set in the same way.

In other embodiments, the set identifier 906 may determine that two or more elements that share at least a threshold number of attributes (e.g., height, width, shape, color, font) belong to a set. Furthermore, the set identifier 906 can communicate with one or more other components of the interface resizing system 900. For instance, the set identifier 906 can communicate with the quadrant manager 908 to transmit information relating to identified relationships and sets.

Additionally, the interface resizing system 900 includes a quadrant manager 908. In particular, the quadrant manager 908 manages the quadrants within the user selection. To illustrate, the quadrant manager 908 communicates with the user input manager 902 and the user selection analyzer 904 to detect when the user selects one or more edges of the user selection, and to further determine the boundaries of each of the four quadrants. In response to detecting a user input to select one or more edges of the user selection, the quadrant manager 908 binds the quadrants to their respective edges of the user selection. To elaborate, and as described above, the quadrant manager 908 binds each quadrant to the edges of the user selection to which each respective quadrant is adjacent. For example, the quadrant manager 908 binds the upper-left quadrant to the top edge and the left edge of the user selection. Likewise, the quadrant manager 908 binds the upper-right quadrant to the top edge and the right edge of the user selection, and so on for the lower-left and lower-right quadrants.

Furthermore, the quadrant manager 908 moves the quadrants together with any moving edges of the user selection. More specifically, the quadrant manager 908 moves each individual object and/or element within a given quadrant based on determined relationships between each object/element and a pivot point, as described above. To illustrate, in some embodiments the quadrant manager 908 is essentially a component of a resize function. For instance, given a user selection, the quadrant manager 908 runs a function on each object and/or element in the selection to determine where each object/element should be located within the user selection (e.g., in a global context), and at what size. The quadrant manager 908 repeats the function many times over during the course of a user input to scale or resize the user selection. In some embodiments, the quadrant manager 908 stops executing the function when the user input stops (e.g., the mouse is released). Furthermore, the quadrant manager 908 then invalidates the old relationships in favor of determining new ones based on the new positions of objects/elements within the user selection.

For example, as the user moves the top edge of the user selection, the quadrant manager 908 moves those quadrants that are bound to the top edge (e.g., the top-left quadrant and the top-right quadrant) together with the top edge, in accordance with the user input as detected by the user input manager 902. Continuing the example, the quadrant manager 908 constrains the movement of the quadrants according to which edge(s) of the user selection are selected. For instance, when the user input manager 902 indicates that the top edge of the user selection is selected, the quadrant manager 908 constrains the movement of the top two quadrants (e.g., those quadrants that are bound to the top edge) to the vertical dimension (e.g., up or down). Likewise, if the user input manager 902 indicates that user selects the left edge or the right edge of the user selection, the quadrant manager 908 constrains the movement of the quadrants bound to the selected edges to the horizontal (e.g., left or right) dimension.

In cases where the user input manager 902 indicates that the user selects a corner of the user selection, the quadrant manager 908 constrains the movement of the quadrants bound to the selected edges in the same fashion. In other words, the quadrant manager 908 moves the quadrant bound to both moving edges (e.g., the two edges that make up the selected corner) in both a horizontal direction and a vertical direction in accordance with the user input. For the quadrants bound to just one of the moving edges, the quadrant manager 908 constrains the movement of the quadrant to either a vertical dimension (e.g., for the quadrant bound to the horizontal selected edge) or a horizontal dimension (e.g., for the quadrant bound to the vertical selected edge).

As the quadrant manager 908 moves the quadrants, the quadrant manager 908 further pins the identified elements within each quadrant. In particular, the quadrant manager 908 pins the elements to maintain the position, spacing, etc. of the elements within their respective quadrants. In addition, the quadrant manager 908 scales those elements that cross the boundary between quadrants in accordance with the disclosure provided above.

Furthermore, as described above, for any quadrants that are bound to non-moving edges of the user selection (e.g., edges that are not selected), the quadrant manager 908 maintains the position of the quadrant—i.e., the quadrant manager 908 does not move the quadrant.

As illustrated in FIG. 9, the interface resizing system 900 further includes a display manager 910. The display manager 910 communicates with the other components of the interface resizing system to, for example, display the movement of the quadrants in response to user input. Additionally, the display manager 910 displays the pivot point, horizontal and vertical transverse lines, elements, handles, and other features described above in response to receiving an indication from the user input manager 902, user selection analyzer 904, and/or other component of the interface resizing system 900 to do so. To illustrate, the display manager 910 may further communicate with a display of a computing device to render thereon the graphical user interface described herein.

As further illustrated in FIG. 9, the interface resizing system 900 includes a storage manager 912. The storage manager 912 includes therein element data 914 and quadrant data 916. In particular, the storage manager 912 communicates with the user selection analyzer 904 to receive and store element data 914 pertaining to each of the elements identified within the user selection. For instance, the storage manager 912 stores information relating to the position, size, and other attributes of each element. In this way, other components may access the element data 914 so that the interface resizing system 900 may maintain the placement of each element within its respective quadrant throughout the movement of one or more quadrants.

Furthermore, the storage manager 912 stores information relating to the size and segmentation of the quadrants of the user selection in quadrant data 916. In particular, the storage manager 912 stores information relating to the position of the pivot point, and further stores information about the rules that apply to each quadrant. For instance, upon detecting a user selection of an edge of the user selection, the user input manager 902 and the quadrant manager 908 communicate with the storage manager 912 to transmit information pertaining to which quadrants are bound to the selected edge and which are not.

Figure 10:
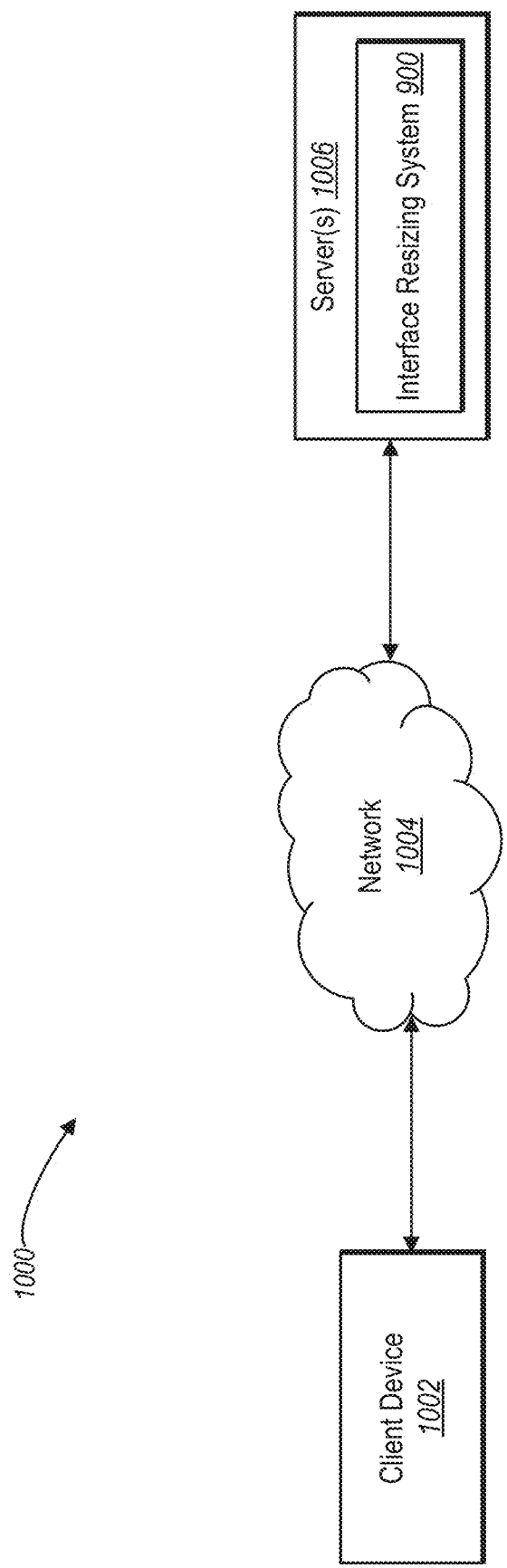
FIG. 10 illustrates an example environment in which the interface resizing system operates in accordance with one or more embodiments.

FIG. 10 illustrates a schematic diagram of one embodiment of an exemplary environment 1000 in which the interface resizing system 900 operates. In one or more embodiments, the exemplary environment 1000 includes a client device 1002, a network 1004, and one or more server(s) 1006 housing the interface resizing system 900.

As illustrated in FIG. 10, the environment 1000 may include a client device 1002. In particular, the client device 1002 can communicate, via network 1004, with the server(s) 1006 housing the interface resizing system 900. Alternatively, the client device 1002 can house the interface resizing system 900. Accordingly, the client device 1002 can communicate with the server(s) 1006 to request permission or access to use the interface resizing system 900 (e.g., in embodiments where the interface resizing system 900 provides a subscription-based service).

As also illustrated in FIG. 10, the environment 1000 may further include a network 1004. In particular, the network 1004 can interface the client device 1002 with the server(s) 1006. Accordingly, the network 1004 can facilitate communications between the client device 1002 and the server(s) 1006 via appropriate network protocol.

Although FIG. 10 illustrates a particular arrangement of the environment 1000, including the client device 1002, the network 1004, and the one or more server(s) 1006, various additional or alternative arrangements are possible. For example, while FIG. 10 illustrates a single client device 1002 in communication with a network 1004 and the server(s) 1006, in one or more embodiments multiple client devices may communicate directly with the server(s) 1006, bypassing network 1004.

In another example, in one or more embodiments, the environment 1000 does not include server(s) 1006. Instead, the client device 1002 may house the interface resizing system 900. Thus, the interface resizing system 900 may initiate an interface resizing process as described above. Therefore, the client device 1002 and/or the server(s) 1006 can resizing a graphical user interface or a selection within a graphical user interface, as described in detail above.

Figure 11:
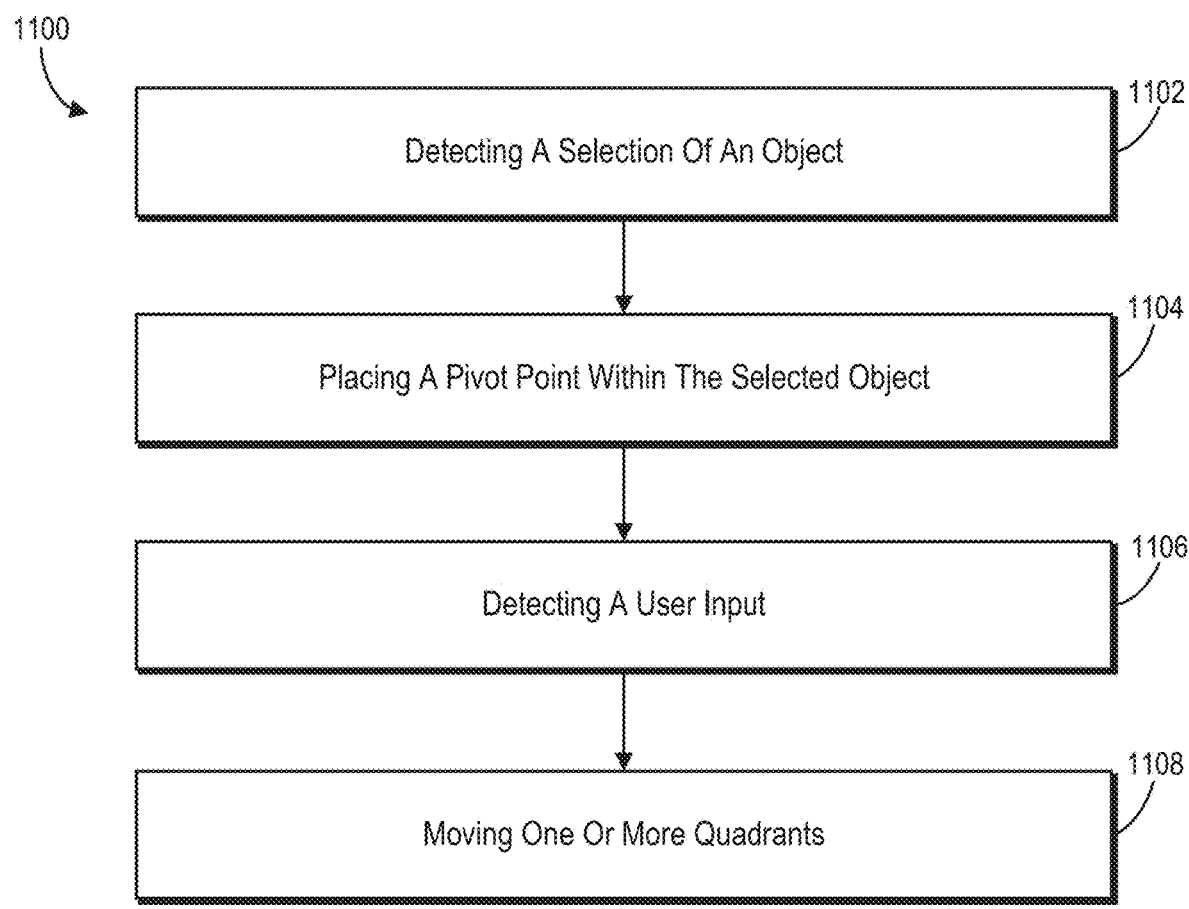
FIG. 11 illustrates a flowchart of a series of acts in a method for resizing a graphical user interface in accordance with one or more embodiments.

FIGS. 1-10, the corresponding text, and the examples provide a number of different systems and methods that resize a graphical user interface. In addition to the foregoing, embodiments can also be described in terms of flowcharts comprising acts and/or steps in a method for accomplishing a particular result. For example, turning now to FIG. 11, this figure illustrates a flowchart of a series of acts 1100 of resizing a graphical user interface in accordance with one or more embodiments. While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer readable medium can comprise instructions, that when executed by one or more processors, cause a computing device to perform the acts of FIG. 11. In still further embodiments, a system can perform the acts of FIG. 11.

FIG. 11 illustrates an exemplary method 1100 for resizing a graphical user interface in accordance with one or more embodiments. In particular, as illustrated in FIG. 11, the method 1100 can include an act 1102 of detecting a selection of an object. For example, the act 1102 can involve detecting a selection of an object within a graphical user interface presented for display to a user. In some embodiments, the selected object can include an entire graphical user interface.

In addition, the method 1100 can include an act 1104 of placing a pivot point within the selected object. In particular, the act 1104 can involve placing a pivot point within the selected object, the pivot point segmenting the selected object into quadrants, each quadrant being bounded by two edges of the selected object as well as an initial vertical position of the pivot point and an initial horizontal position of the pivot point. The method 1100 can include an act of determining that an element within the selected object crosses a boundary between two or more quadrants, and, during the detected user input to resize the selected object, maintaining a relative position of the element with respect to each quadrant by scaling the element in accordance with the detected user input.

Furthermore, the method 1100 can include an act 1106 of detecting a user input. In particular, the act 1106 can involve detecting a user input to resize the selected object, the user input including a selection of one or more edges of the selected object and further including a movement of the one or more selected edges (e.g., in a given direction). For example, the user input to resize the selected object can include a selection of one edge of the selected object. Thus, moving the one or more quadrants can include moving, along a single dimension, two quadrants that are bound to the selected edge. In addition, the user input to resize the graphical user interface can include a selection of a corner of the selected object, the corner comprising an intersection of two edges of the selected object. Accordingly, the movement of the detected user input can include a horizontal component and a vertical component, and moving the one or more quadrants can include moving, along a horizontal dimension and a vertical dimension, the three quadrants that are bound to the selected edges in accordance with the horizontal component and the vertical component of the detected user input, respectively.

Additionally, the method 1100 can include an act 1108 of moving one or more quadrants. In particular, the act 1108 can involve, in response to the user input, moving one or more quadrants in accordance with the movement of the one or more selected edges. The act 1108 can involve moving one or more quadrants whose movement is fixed to movement of the one or more selected edges in the direction of the user input to resize the selected object. As illustrated in FIG. 11, the act 1108 can involve, in response to detecting the selection of the one or more edges of the selected object, fixing movement of each quadrant of the selected object to movement of any edges of the selected object that are adjacent to each respective quadrant. For example, the act 1108 can further involve fixing each quadrant to two edges of the selected object that are adjacent to each respective quadrant such that, in response to detecting the movement of the one or more selected edges to resize the selected object, each quadrant moves with any movement of its bound edges.

Although not illustrated in FIG. 11, the method 1100 can include an act of, in response to detecting that the direction of the user input is toward the pivot point, collapsing the one or more quadrants that are bound to the one or more selected edges into one or more quadrants that are bound to non-selected edges, and removing space from the selected object from the one or more quadrants that are bound to non-selected edges of the selected object. Similarly, the method 1100 can include an act of, in response to detecting that the direction of the user input is away from the pivot point, adding space to the selected object between the one or more quadrants that are bound to the one or more selected edges and one or more quadrants that are bound to non-selected edges of the selected object. For instance, adding space to the graphical user interface can include adding new space with features that match a space around the pivot point.

Additionally, the method 1100 can include an act retaining a position of one or more quadrants that are adjacent to one or more non-selected edges of the selected object. The method 1100 can also include acts of detecting a cursor location of a cursor operated by the user, determining one or more edges of the object that are nearest to the cursor location, and generating, for display to the user, one or more transverse lines, each transverse line spanning the object parallel to one of the one or more edges of the object that are nearest to the cursor location, and each transverse line further intersecting the pivot point. Furthermore, the method 1100 can include an act of highlighting one or more quadrants of the object that are adjacent to the one or more edges that are nearest to the cursor location.

The method 1100 can also include an act of generating, during the user input to resize the selected object and in response to detecting that the direction of the user input is toward the pivot point, a view of overlapping space where the one or more moving quadrants that are bound to the one or more selected edges slide over one or more non-moving quadrants. The method 1100 can further include an act of generating, during the user input and in response to detecting that the direction of the user input is away from the pivot point, a view of new space to add to the selected object between the moving quadrants bound to the one or more selected edges and the one or more non-moving quadrants.

Furthermore, the method 1100 can include an act of detecting a user input to move the pivot point, an act of, in response to detecting the user input to move the pivot point, generating, for display to the user, a vertical line through the pivot point and a horizontal line through the pivot point to help the user in repositioning the pivot point, and an act of repositioning the pivot point in accordance with the detected user input to move the pivot point.

Although not illustrated in FIG. 11, the method 1100 may also include acts of analyzing the selected object to identify visually related elements within the selected object, and scaling the identified visually related elements together in accordance with the detected user input. In particular, identifying visually related elements can include determining a relationship between two or more elements based on a location of the two or more elements within the selected object.

Figure 12:
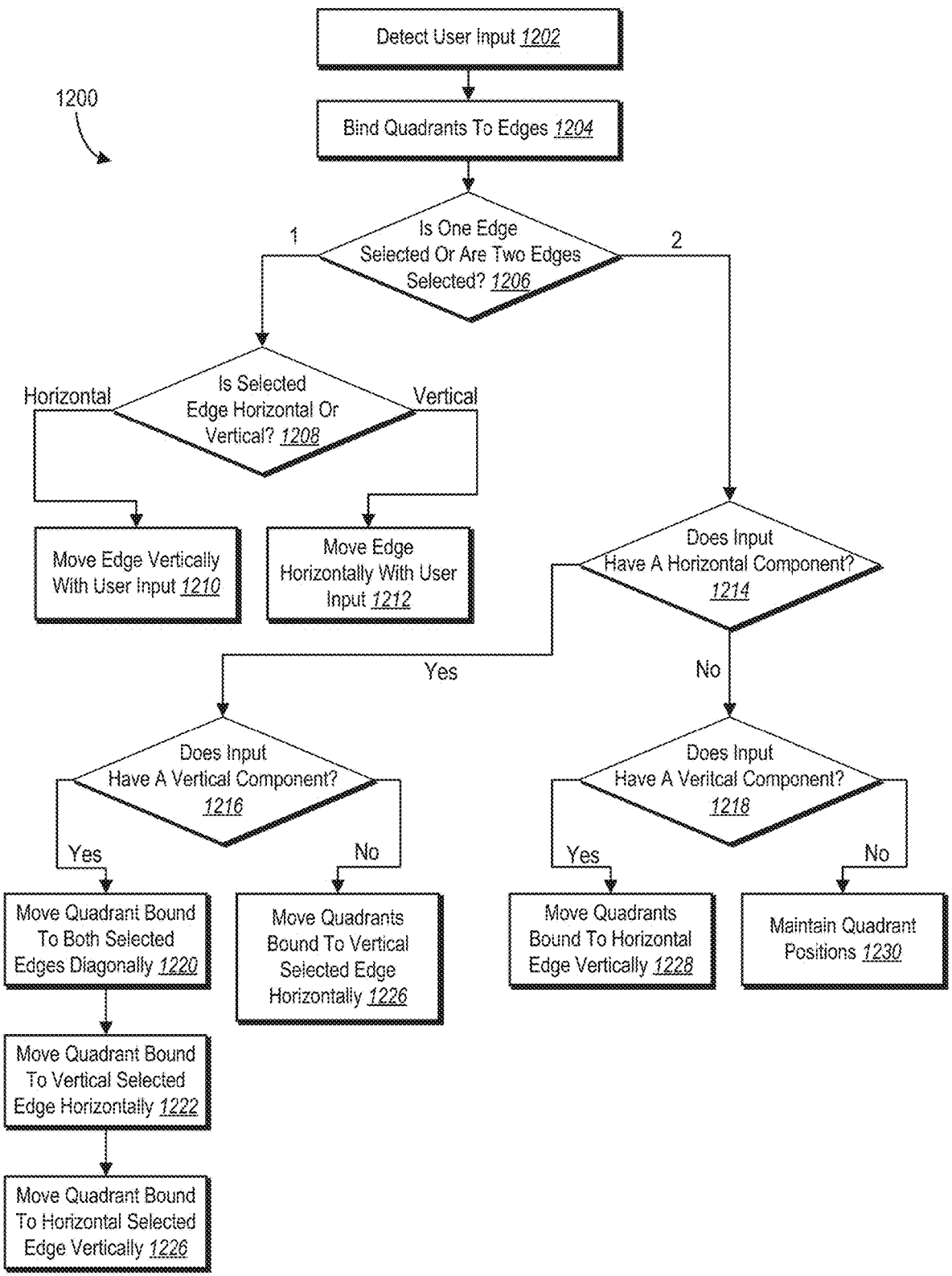
FIG. 12 illustrates a flowchart of a series of acts in a step for resizing a graphical user interface in accordance with one or more embodiments.

FIG. 12 illustrates a sequence 1200 of acts in a step for resizing a selected object in accordance with user input. In particular, the sequence 1200 includes an act 1202 to detect user input. For example, the interface resizing system detects user input to select one or more edges of a user selection, as described in detail above.

As illustrated by FIG. 12, the sequence 1200 also includes an act 1204 to bind the quadrants of the user selection to their respective edges. As described above, the interface resizing system binds each quadrant to its outer edges. In other words, the interface resizing system binds each quadrant to the edges of the user selection that define any sides of the given quadrant.

The sequence 1200 further includes an act 1206 to determine whether one or two edges of the user selection are selected. In particular, the interface resizing system detects whether a handle located only on an edge of the user selection is selected, or if a handle located on a corner of the user selection is selected. In response to detecting that a single edge is selected, the interface resizing system continues to act 1208 to determine if the selected edge is horizontal or vertical.

For instance, the interface resizing system detects which handle is selected and determines whether the handle is located on a horizontal edge or a vertical edge of the user selection. In response to detecting that the selected edge is horizontal, the interface resizing system performs act 1210 and moves the selected edge vertically in accordance with the user input. For example, the interface resizing system constrains the movement of the selected edge to the vertical dimension because a horizontal edge can only move up or down to resize the user selection while maintaining the relative shape of the user selection. Accordingly, the interface resizing system detects a vertical component of the user input and moves the selected edge based on the detected vertical component, as described above.

In response to determining that the selected edge is vertical, the interface resizing system executes act 1212 to move the selected edge of the user selection horizontally based on the user input. To illustrate, the interface resizing system constrains the movement of vertical edges to the horizontal dimension (e.g., left and right), as described in further detail above.

Conversely, if the interface resizing system determines that two edges (e.g., a corner) of the user selection are selected, the interface resizing system continues to execute act 1214 to determine whether the detected user input to move the selected edges has a horizontal component. In particular, the interface resizing system detects whether the user moves the selected edges, together with the cursor, to the left and/or to the right.

In response to determining that the user input contains a horizontal component, the interface resizing system moves on to perform act 1216 to determine whether the user input includes a vertical component. If the user input does include a horizontal component as well as a vertical component, the interface resizing system performs act 1220 to move the quadrant bound to both of the selected edges diagonally in the direction of the user input. In addition, the interface resizing system performs act 1222 to move the quadrant bound to the vertical selected edge but not bound to the horizontal selected edge in a horizontal direction with the user input. Further, the interface resizing system performs act 1226 and moves the quadrant bound to the horizontal selected edge but not bound to the vertical selected edge in a vertical direction with the user input.

If, on the other, the interface resizing system determines that the user input does not contain a vertical component in addition to its horizontal component, the interface resizing system performs act 1226 to move the quadrants bound to the vertical selected edge in a horizontal direction in accordance with the user input.

Looking back to FIG. 12, if the interface resizing system determines that the user input does not include a horizontal component, then the interface resizing moves to act 1218 to determine whether the user input includes a vertical component. In response to determining that the user input contains a vertical component but no horizontal component, the interface resizing system performs act 1228 to move the quadrants bound to the horizontal edge in a vertical direction in accordance with the user input. In other words, the interface resizing system moves those quadrants bound to the one horizontal edge of the two edges that form the selected corner in a vertical direction. The interface resizing system maintains the positions of the other quadrants.

In response to determining that the user input does not include a vertical component, and further does not include a horizontal, the interface resizing system maintains the positions of all quadrants by performing act 1230. In other words, the interface resizing system does not move any of the quadrants within the user selection.

While FIG. 12 illustrates a particular order of the acts within sequence 1200, it will be understood from the disclosure herein that the acts may be performed in additional or alternative orders. For example, in some embodiments, the interface resizing system may determine whether the user input contains a vertical component (e.g., acts 126 and 1218) before determining whether the user input contains a horizontal component (e.g., act 1214).

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
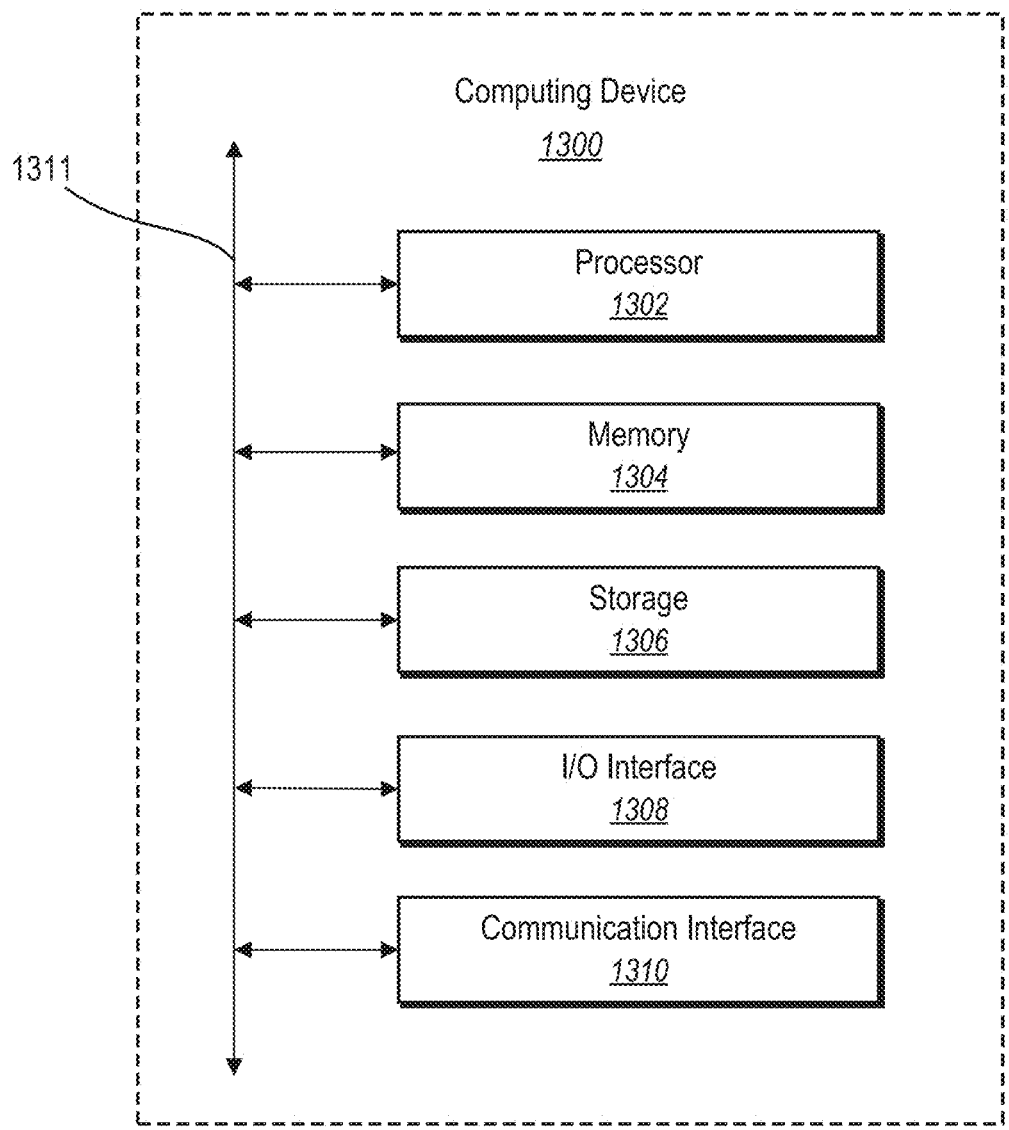
FIG. 13 illustrates a block diagram of an example computing device in accordance with one or more embodiments.

FIG. 13 illustrates, in block diagram form, an exemplary computing device 1300 that may be configured to perform one or more of the processes described above. One will appreciate that the interface resizing system 900 can comprise implementations of the computing device 1300. As shown by FIG. 13, the computing device can comprise a processor 1302, memory 1304, a storage device 1306, an I/O interface 1308, and a communication interface 1310. In certain embodiments, the computing device 1300 can include fewer or more components than those shown in FIG. 13. Components of computing device 1300 shown in FIG. 13 will now be described in additional detail.

In particular embodiments, processor(s) 1302 includes hardware for executing instructions, such as those making up a computer program. As an example, and not by way of limitation, to execute instructions, processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1304 may be internal or distributed memory.

The computing device 1300 includes a storage device 1306 includes storage for storing data or instructions. As an example, and not by way of limitation, storage device 1306 can comprise a non-transitory storage medium described above. The storage device 1306 may include a hard disk drive (HDD), flash memory, a Universal Serial Bus (USB) drive or a combination of these or other storage devices.

The computing device 1300 also includes one or more input or output ("I/O") devices/interfaces 1308, which are provided to allow a user to provide input to (such as user strokes), receive output from, and otherwise transfer data to and from the computing device 1300. These I/O devices/interfaces 1308 may include a mouse, keypad or a keyboard, a touch screen, camera, optical scanner, network interface, modem, other known I/O devices or a combination of such I/O devices/interfaces 1308. The touch screen may be activated with a stylus or a finger.

The I/O devices/interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1308 is configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 can provide one or more interfaces for communication (such as, for example, packet-based communication) between the computing device and one or more other computing devices 1300 or one or more networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1311. The bus 1311 can comprise hardware, software, or both that couples components of computing device 1300 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. In a digital medium environment for designing graphical user interfaces, a computer-implemented method of resizing a graphical user interface comprising:
   detecting a selection of an object of a graphical user interface presented for display to a user, the object including a plurality of elements;
   placing a pivot point at a vertical position and a horizontal position within the selected object, the pivot point segmenting the selected object into quadrants and moveable to resize the quadrants;
   identifying two or more elements of the plurality of elements that are intersected by one or both of the vertical position or the horizontal position of the pivot point;
   detecting a single user input to resize the selected object, the single user input comprising a selection of one or more edges of the selected object and further comprising a movement of the one or more selected edges; and
   in response to the single user input, scaling the two or more elements that are intersected by one or both of the vertical position or the horizontal position of the pivot point by maintaining at least one distance of the two or more elements relative to the selected one or more edges during the user input.

2. The computer-implemented method of claim 1, wherein:
   the single user input to resize the selected object is in a direction away from the pivot point; and
   scaling the two or more elements comprises increasing the size of the two or more elements.

3. The computer-implemented method of claim 1, wherein identifying the two or more elements that are intersected by one or both of the vertical position or the horizontal position of the pivot point comprises:
   identifying a first element that is intersected by the horizontal position of the pivot point; and
   identifying a second element that is intersected by the vertical position and the horizontal position of the pivot point.

4. The computer-implemented method of claim 1, further comprising, in response to detecting that a direction of the single user input is toward the pivot point:
   moving quadrants that are bound to the one or more selected edges into quadrants that are bound to non-selected edges; and
   reducing a size of the selected object by removing space from the quadrants that are bound to non-selected edges.

5. The computer-implemented method of claim 1, further comprising, in response to detecting that a direction of the single user input is away from the pivot point, increasing a size of the selected object by adding space between quadrants bound to the one or more selected edges and quadrants bound to non-selected edges.

6. The computer-implemented method of claim 1, wherein scaling the two or more elements that are intersected by one or both of the vertical position or the horizontal position of the pivot point comprises:
   determining relationships between the two or more elements and the one or more selected edges; and
   maintaining the determined relationships during the single user input to prevent distortion in shape of the two or more elements.

7. The computer-implemented method of claim 1, further comprising:
   detecting a second user input to move the pivot point within the selected object; and
   resizing the quadrants in accordance with the second user input.

8. The computer-implemented method of claim 1, further comprising:
   generating, during the single user input and in response to detecting that a direction of the single user input is toward the pivot point, a view of overlapping space where moving quadrants that are bound to the one or more selected edges slide over non-moving quadrants; and
   generating, during the single user input and in response to detecting that a direction of the single user input is away from the pivot point, a view of new space to add to the selected object between the moving quadrants and the non-moving quadrants.

9. The computer-implemented method of claim 1, further comprising:
   identifying a particular element of the plurality of elements that is not intersected by the vertical position or the horizontal position of the pivot point;
   determining a relative position between the particular element and an edge of a quadrant where the particular element is located; and
   during the single user input, maintaining the relative position of the particular element with respect to the edge of the quadrant where the particular element is located.

10. The computer-implemented method of claim 1, further comprising:
    identifying, from the plurality of elements, a set of elements that have a common vertical alignment relative to each other; and
    in response to the single user input, scaling the set of elements while maintaining the common vertical alignment.

11. The computer-implemented method of claim 1, wherein the single user input to resize the selected object comprises a selection of one edge of the selected object.

12. The computer-implemented method of claim 11, wherein scaling the two or more elements comprises scaling the two or more elements in a single direction in accordance with movement of the one edge.

13. The computer-implemented method of claim 1, wherein the single user input to resize the graphical user interface comprises a selection of a corner of the selected object, the corner comprising an intersection of two edges of the selected object.

14. The computer-implemented method of claim 13, wherein scaling the two or more elements comprises scaling the two or more elements in two directions direction in accordance with movement of the two edges.

15. A system for resizing a graphical user interface by manipulating image edges with respect to a reference point, the system comprising:
  at least one processor;
  a memory comprising:
    graphical user interface data; and
    image resizing tool rules; and
  a server device comprising instructions thereon that, when executed by the at least one processor, cause the server device to:
    detect a selection of an object within a graphical user interface presented for display to a user, the object including a plurality of elements;
    place a pivot point at a vertical position and a horizontal position within the selected object, the pivot point segmenting the selected object into quadrants and moveable to resize the quadrants;
    identify two or more elements of the plurality of elements that are intersected by one or both of the vertical position or the horizontal position of the pivot point;
    detect a single user input to resize the selected object, the single user input comprising a selection of one or more edges of the selected object and further comprising a movement of the one or more selected edges; and
    in response to the single user input, scale the two or more elements that are intersected by one or both of the vertical position or the horizontal position of the pivot point by maintaining at least one distance of the two or more elements relative to the selected one or more edges during the user input.

16. The system of claim 15, further comprising instructions thereon that, when executed by the at least on processor, cause the server device to:
  analyze the selected object to identify a set of elements within the selected object that have a common shape and size; and
  based on identifying the set of elements with common shape and size, scale the identified set of elements together in accordance with the detected user input.

17. The system of claim 15, further comprising instructions thereon that, when executed by the at least on processor, cause the server device to:
  detect an additional user input to move the pivot point; and
  in response to the additional user input to move the pivot point:
    generate, for display to the user, a vertical line through the pivot point and a horizontal line through the pivot point to help the user in repositioning the pivot point; and
    reposition the pivot point in accordance with the detected user input to move the pivot point.

18. A non-transitory computer readable medium comprising instructions that, when executed by at least one processor, cause a computing device to:
  detect a selection of an object of a graphical user interface presented for display to a user, the object including a plurality of elements;
  place a pivot point at a vertical position and a horizontal position within the selected object, the pivot point segmenting the selected object into quadrants and moveable to resize the quadrants;
  identify two or more elements of the plurality of elements that are intersected by one or both of the vertical position or the horizontal position of the pivot point;
  detect a single user input to resize the selected object, the single user input comprising a selection of one or more edges of the selected object and further comprising a movement of the one or more selected edges; and
  in response to the single user input, scale the two or more elements that are intersected by one or both of the vertical position or the horizontal position of the pivot point by maintaining at least one distance of the two or more elements relative to the selected one or more edges during the user input.

19. The non-transitory computer readable medium of claim 18, further comprising instructions that, when executed by the at least one processor, cause the computing device to identify the two or more elements that are intersected by one or both of the vertical position or the horizontal position of the pivot point by:
  identifying a first element that is intersected by the horizontal position of the pivot point; and
  identifying a second element that is intersected by the vertical position and the horizontal position of the pivot point.

20. The non-transitory computer readable medium of claim 18, further comprising instructions that, when executed by the at least one processor, cause the computing device to scale the two or more elements that are intersected by one or both of the vertical position or the horizontal position of the pivot point by:
  determining relationships between the two or more elements and the one or more selected edges; and
  maintaining the determined relationships during the single user input to prevent distortion in shape or size of the two or more elements.

* * * * *